US012810165B2

(12) United States Patent
Oppl

(10) Patent No.: US 12,810,165 B2
(45) Date of Patent: Nov. 24, 2026

(54) SYSTEM AND METHOD FOR DATA PROCESSING USING SHARED MEMORY AND PARALLEL PROCESSING FOR DATA HUB AND COMPUTATION MODULES

(71) Applicant: Xephor Solutions GmbH, Purkersdorf (AT)

(72) Inventor: Konstantin Oppl, Purkersdorf (AT)

(73) Assignee: XEPHOR SOLUTIONS GMBH, Purkersdorf (AT)

( * ) Notice: Subject to any disclaimer, the term of this patent is extended or adjusted under 35 U.S.C. 154(b) by 931 days.

(21) Appl. No.: 18/100,777

(22) Filed: Jan. 24, 2023

(65) Prior Publication Data

US 2023/0237340 A1 Jul. 27, 2023

Related U.S. Application Data

(63) Continuation of application No. PCT/EP2021/072528, filed on Aug. 12, 2021.

(30) Foreign Application Priority Data

Aug. 31, 2020 (EP) .................................... 20193672

(51) Int. Cl.
*G06N 3/088* (2023.01)
*G06V 10/26* (2022.01)
(Continued)

(52) U.S. Cl.
CPC ............. *G06N 3/088* (2013.01); *G06V 10/26* (2022.01); *G06V 10/764* (2022.01); *G06V 10/82* (2022.01); *G06V 10/955* (2022.01); *G06V 10/96* (2022.01)

(58) Field of Classification Search
CPC ........ G06N 3/088; G06V 10/96; G06V 10/82; G06V 10/955; G06V 10/26; G06V 10/764
See application file for complete search history.

(56) References Cited

U.S. PATENT DOCUMENTS 6,879,946 B2 4/2005 Rong et al.
6,964,037 B1 11/2005 Paviovic et al.
(Continued)

FOREIGN PATENT DOCUMENTS

CN 111226230 6/2020
CN 111357018 6/2020
(Continued)

OTHER PUBLICATIONS

Robert Goldblatt, "The Categorical Analysis of Logic", revised edition, 2006, Dover Publications (Book Cover, Table of Contents and Prospectus pages only).
(Continued)

*Primary Examiner* — Barbara M Level
(74) *Attorney, Agent, or Firm* — Wenderoth, Lind & Ponack, L.L.P.

(57) ABSTRACT

A computer-implemented method for processing data includes receiving input data; outputting output data; reading data from and writing data into a shared memory; and executing, in parallel: a data hub process of receiving the input data, the data hub process including a keying sub-process which provides keys to data segments of the input data creating keyed data segments such that the data hub process stores the keyed data segments in the shared memory as shared keyed data segments; and computation modules each configured to: access the shared memory to look for module-specific data segments which are the shared keyed data segments that are keyed specifically for one computation module; execute a machine learning method on the module-specific data segments including data interpretation and classification methods using an artificial neuronal network; and output a result of the machine learning method to the shared memory or another computation module.

43 Claims, 25 Drawing Sheets

(51) Int. Cl.

| | |
|---|---|
| ***G06V 10/764*** | (2022.01) |
| ***G06V 10/82*** | (2022.01) |
| ***G06V 10/94*** | (2022.01) |
| ***G06V 10/96*** | (2022.01) |

(56) References Cited

U.S. PATENT DOCUMENTS

| | | | | |
|---|---|---|---|---|
| 7,319,951 | B2 | 1/2008 | Rising, III et al. | |
| 8,522,651 | B2 | 9/2013 | Xu | |
| 8,751,918 | B2 | 6/2014 | Goranson et al. | |
| 9,075,670 | B1 | 7/2015 | Nick et al. | |
| 9,117,167 | B2 | 8/2015 | Goranson | |
| 9,170,848 | B1 | 10/2015 | Goldman et al. | |
| 9,300,712 | B2 | 3/2016 | Nick et al. | |
| 9,536,014 | B1 | 1/2017 | Goldman et al. | |
| 9,760,595 | B1 | 9/2017 | Goldman et al. | |
| 10,332,562 | B2 | 6/2019 | Goranson | |
| 10,360,503 | B2 | 7/2019 | Goranson et al. | |
| 10,838,903 | B2 | 11/2020 | Oppi | |
| 11,084,168 | B2 | 8/2021 | Namiki | |
| 11,295,238 | B2 | 4/2022 | Tabuchi | |
| 11,804,050 | B1 * | 10/2023 | Milletari | G06N 3/0895 |
| 11,869,237 | B2 | 1/2024 | Bashkirov et al. | |
| 2001/0047254 | A1 | 11/2001 | Rising, III et al. | |
| 2002/0013783 | A1 | 1/2002 | Rising, III et al. | |
| 2002/0095276 | A1 | 7/2002 | Rong et al. | |
| 2008/0288856 | A1 | 11/2008 | Goranson et al. | |
| 2010/0116097 | A1 | 5/2010 | Xu | |
| 2010/0268769 | A1 | 10/2010 | Goranson | |
| 2012/0048068 | A1 | 3/2012 | Xu | |
| 2012/0089626 | A1 | 4/2012 | Goranson | |
| 2012/0117114 | A1 | 5/2012 | Goranson | |
| 2014/0156733 | A1 | 6/2014 | Goranson | |
| 2014/0164298 | A1 | 6/2014 | Goranson et al. | |
| 2014/0281865 | A1 | 9/2014 | Goranson et al. | |
| 2015/0279425 | A1 | 10/2015 | Goranson | |
| 2015/0324690 | A1 | 11/2015 | Chilimbi et al. | |
| 2015/0363673 | A1 | 12/2015 | Goranson | |
| 2016/0036878 | A1 | 2/2016 | Nick et al. | |
| 2016/0132787 | A1 * | 5/2016 | Drevo | G06N 20/10 706/12 |
| 2016/0309004 | A9 | 10/2016 | Goranson | |
| 2017/0032259 | A1 | 2/2017 | Goranson et al. | |
| 2017/0372221 | A1 | 12/2017 | Krishnamurthy et al. | |
| 2018/0075877 | A1 * | 3/2018 | Cilingir | G10L 17/06 |
| 2019/0061151 | A1 | 2/2019 | Namiki | |
| 2019/0073567 | A1 * | 3/2019 | Itou | G06V 10/82 |
| 2019/0102667 | A1 | 4/2019 | Bashkirov et al. | |
| 2019/0114534 | A1 | 4/2019 | Teng et al. | |
| 2019/0243795 | A1 | 8/2019 | Oppl | |
| 2019/0244129 | A1 | 8/2019 | Tabuchi et al. | |
| 2020/0004891 | A1 * | 1/2020 | Kumar | G06F 3/0486 |
| 2020/0042903 | A1 | 2/2020 | Moazzami et al. | |
| 2020/0117519 | A1 * | 4/2020 | Chen | G06F 15/163 |
| 2020/0320401 | A1 * | 10/2020 | Jampani | G06N 3/084 |
| 2020/0364872 | A1 | 11/2020 | Shlens et al. | |
| 2022/0044128 | A1 | 2/2022 | Goranson et al. | |

FOREIGN PATENT DOCUMENTS

| | | |
|---|---|---|
| EP | 2 980 701 | 2/2016 |
| JP | 2019-133610 | 8/2019 |
| WO | 2019/067229 | 4/2019 |

OTHER PUBLICATIONS

Tai-Danae Bradley, “What is Applied Category Theory”, cf.arXiv:1809.05923v2, pp. 1-50, Oct. 3, 2018.

Saunders Mac Lane, “Categories for the Working Mathematician”, Second Edition, Springer, 1998.

David I. Spivak, Category Theory for Scientists (Old Version), The MIT Press, Sep. 17, 2013.

Liang Luo et al., “Parameter Hub: a Rack-Scale Parameter Server for Distributed Deep Neural Network Training”, arxiv.org, Cornell University Library, 201 Olin Library Cornell University Ithaca, NY 14853, May 21, 2018 (May 21, 2018), XP081581141, DOI: 10.1145/3267809.3267840, pp. 1-15.

Atif G. Hashmi et al., “Cortical cols. Building Blocks for Intelligent Systems”, Computational Intelligence for Multimedia Signal and Vision Processing, 2009. CIMSVP ’09. IEEE Symposium On IEEE, Piscataway, NJ, USA, Mar. 30, 2009, XP031455887, DOI: 10.1109/CIMSVP.2009.4925643, ISBN: 9781424427710, pp. 21-28.

Simone Scardapane et al., “A framework for parallel and distributed training of neural networks”, Neural Networks., vol. 91, Jul. 1, 2017, XP093405102, GB ISSN: 0893-6080, DOI: 10.1016/j.neunet.2017.04.004, pp. 42-54.

* cited by examiner

SYSTEM AND METHOD FOR DATA PROCESSING USING SHARED MEMORY AND PARALLEL PROCESSING FOR DATA HUB AND COMPUTATION MODULES

TECHNICAL FIELD

The present invention relates to the field of data processing and machine learning and in particular to data processing employing methods of machine learning to process data of any kind, e.g., representing text, graphical data such as pictures or movies or sound data such as spoken language (understanding and creating language), and in particular combined types of data such as combined graphical data and text, more generally to a data processing device having the features of the preamble of claim 1, a method having the features of the preamble of claim 14 and a computer program.

BACKGROUND

U.S. Pat. No. 6,879,946 B2 discloses a computerized method for intelligent 2D and 3D object and scene modelling, transformation and manipulation using attributed hypergraph representations (AHR) for modelling, transforming and manipulating objects. The procedure of constructing an AHR given the features of a 3D object or scene corresponds to mapping different categories to one another using functors. The different categories represent, e.g., geometrical, physical and graph representations of a 3D object or scene.

U.S. Pat. No. 6,964,037 B1 discloses a computer-implemented method for determining colimits of hereditary diagrams. The colimit operation glues concepts together into a shared union along shared sub-concepts.

U.S. Pat. No. 7,319,951 B2 discloses a method for designing semantic descriptions for content data using category theory and cognitive science.

U.S. Pat. No. 10,360,503 B2 discloses a system for deriving ontologies using concepts from category theory.

These documents do not use neuronal networks as machine learning methods but, usually huge, databases. The implementation of huge databases is very hardware-intensive.

Document "What is applied category theory?" by Tai-Danae Bradley (cf. arXiv:1809.05923v2) deals with applying category theory to, i.a., natural language processing. This approach uses statistical methods (cf. chapter 3.2) which are not the best tool to easily deal with natural languages because this approach, in a sense, is too rigid to deal with "soft" natural languages so that a lot of training is necessary.

What is needed is a data processing device and a method for processing data which is better suited to deal with different types of data, e.g., such as graphical data, text, natural languages, and combined types of data such that they provide better results and have lower hardware requirements than the prior art.

SUMMARY OF INVENTION

It is an object of this invention to provide a data processing device and a method for processing data which can process different types of data, and in particular combined types of data, preferably in an at least partially unsupervised way, and have lower hardware requirements than the prior art.

One object of the disclosure relates to a data processing device according to claim 1 which is able to be configured for different aspects of deep learning such as computer vision (image recognition), natural language processing (speech recognition), computer-controlled handling of robots, vehicles and the like and other fields of cognitive computing such as processing of combined types of data, e.g., graphical data combined with text.

Still another object of the invention relates to a method according to claim 14 which is able to realize different aspects of deep learning such as computer vision (image recognition), natural language processing (speech recognition), computer-controlled handling of robots, vehicles and the like and other fields of cognitive computing such as processing of combined types of data, e.g., graphical data combined with text.

Still another object of the invention relates to a computer program according to claim 27 which when the program is executed by a data processing device, causes the data processing device to be configured according to claim 1 or according to any claim directly or indirectly dependent thereon or carry out the method of claim 14.

Embodiments of the invention are defined in the dependent claims.

The invention suggests the use of a large number of computation modules which is possible without high hardware requirements because usually at any given time only a fraction of all of the computation modules will be active and consume a relevant amount of CPU processing power. Idle computation modules consume very little CPU processing power. The large number of computation modules enables a flexible use of a given data processing device since individual computation modules or groups of computation modules can be specialized with respect to different types of data (e.g., graphical data or natural language data) and even with respect to different sub-types of data (e.g. graphical data in the form of different geometric objects, different natural languages, . . . ).

Each computation module can be of simple construction having, e.g., only one or several artificial neuronal networks and input and output interfaces, although more complex constructions involving, e.g., hierarchical layers with different functions regarding data processing, can be present in some embodiments.

The use of categorical constructions in some embodiments allows for at least partially unsupervised learning by the data processing device because at least some unknown concepts can be derived logically by the use of categorical constructs such as commuting diagrams.

By inputting random signals into one or several artificial neurons of the at least one neuronal network of at least some computation modules, new concepts can be thought of by the data processing device in some embodiments. These new concepts can be verified by the data processing device internally by use of categorical constructs and/or by using external information such as confirmation by a teacher or extraction of information from an external database. Once a new concept has been verified it can be used by the data processing device for analysing data and/or unsupervised learning.

DESCRIPTION OF EMBODIMENTS

Terminology:

The term "data processing" is understood to encompass at least one of capturing data, executing data analysis and outputting data for any kind of purpose.

The term "data analysis" is understood to encompass inspecting, transforming, modelling, interpreting, classifying, visualizing data for any kind of purpose.

The term "processing entity" as it is used in the context of this disclosure describes the smallest entity of a CPU that can independently read and execute program instructions. Each processing entity appears to the operating system as an independent processor that can be addressed in a parallel manner. Each CPU provides at least one processing entity, but in the context of high performance computing modern computer systems usually have more than one processing entity. For example the CPU can be a multicore-processor having a plurality of cores. A core is an independent actual processing unit within the CPU that can read and execute program instructions independently from other cores of the CPU. Further each core can allow multi-threading, i.e., one physical core appears as multiple processing entities to the operating system, sometimes referred to as "hardware threads". In other cases each core of the CPU can be a single processing entity or the CPU itself can be a single processing entity. Furthermore it is to be understood that the term CPU is supposed to encompass GPUs.

The term "machine learning" is meant to signify the ability of a data processing device to achieve a desired performance at least partially by exposure to data without the need to follow explicitly programmed instructions, e.g., relying on patterns and/or inference instead. Machine learning methods include the use of artificial neuronal networks (called neuronal networks in this disclosure).

It is to be understood that in the context of this disclosure "different" neuronal networks can mean networks which differ in type (e.g., classical or Quantum general ANNs or more specific ANNs like Multilayer Feedforward NNs, RNNs such as LSTMs, . . . ) and/or in the specific setup (e.g., number of neurons, number of layers, types of layers, number of neurons per layer, connections between neurons, other parameters of the network, . . . ) of the network.

The term "random signal" is meant to mean a signal that takes on random values at any given time instant and can only be modelled stochastically.

With respect to the mathematical language of category theory the usual terminology is applied. For a documentation of category theory, the following texts can, e.g., be consulted:

- Saunders Mac Lane, "Categories for the Working Mathematician", Second Edition, 1998 Springer
- Robert Goldblatt, "Topoi", revised edition, 2006 Dover Publications
- David I. Spivak, "Category Theory for the Sciences", 2014 The MIT Press Configuration and Structure of Data Processing Device:

The data processing device comprises:

- at least one first interface for receiving input data
- at least one second interface for outputting output data
- at least one shared memory device into which data can be written and from which data can be read
- at least one computing device to which the at least one first interface and the at least one second interface and the at least one shared memory device are connected and which is configured to:
- receive input data from the at least one first interface
- send output data to the at least one second interface
- read data from and write data into the at least one shared memory device By way of example, the at least one first interface can be configured to be connectable to a sensor for capturing data (e.g., an optical sensor like a camera, an acoustical sensor like a microphone, . . . ) or comprises at least one such sensor. All kinds of data which can be processed are conceivable to be used in connection with the invention, such as pictorial or video data, sound data, . . . . In addition or alternatively, the at least one first interface can be configured to receive pre-stored data or a data stream provided by other means, e.g., via the internet.

By way of example, the at least one second interface can be configured to be connectable to an output device for outputting data (e.g., a display for displaying optical data, a loudspeaker for outputting sound, . . . ) or comprises at least one such output device. In addition or alternatively, the at least one second interface can be configured to provide output data to a storage device or as a data stream, e.g., via the internet. Regarding the contents of the output data, the output data can include, e.g., spoken language, pictorial or video data in clear format or encoded. In some embodiments command signals can be outputted, in addition or alternatively, which can be used to command actions by a device reading the output data, e.g., command signals which cause motions of a roboter arm or the like. By way of example, after a number of cycles the data processing device might recognize that the input data contains a command and executes said command via the at least one second interface.

The at least one shared memory device (in short: shared memory) into which data can be written and read from can be any suitable computer memory. It is used whenever different processes or threads access the same data. In some embodiments all of the components of the data processing device have access to the shared memory.

The at least one computing device of the data processing device can comprise one or more CPUs wherein it should be understood that each CPU provides a number of processing entities to the operating system of the data processing device.

The initial configuration of the data processing device, i.e., providing all of the components with the described functionalities, could be done by providing a computer program (e.g., using configuration files) which when executed on a data processing device configures the data processing device in the desired manner or the configuration could be provided encoded in hardware, e.g., in the form of ASICS. Of course, an approach in which some of the configuration is done by software and other parts are hardware encoded can also be envisioned.

A possible hardware for implementation of the invention is taught in US 2019/243795 A1 the contents of which is hereby incorporated in its entirety by reference.

The at least one computing device is configured to execute in parallel a plurality of processes comprising at least:

- at least one data hub process
- a plurality of processes in the form of computation modules The data processing device is configured with a given number of computation modules (usually in the amount of at least several hundred but preferably in the amount of several thousand, several ten-thousand, several hundred-thousand or several million computation modules) which can be chosen in dependence on the expected complexity of the data which is to be processed by the data processing device or can be large enough to be able to handle any kind of data which could reasonably be expected to be inputted in the data processing device. In general, the more complex the data is expected to be the higher the number of computation modules should be to provide enough computation power.

It is pre-determined which horizontal computational groups and/or vertical logical layers (explained below) will be present with respect to the computation modules.

It is also pre-determined how many and which neuronal networks are present in which computation modules and how each neuronal network is built.

Furthermore, in some embodiments, a number of categorical constructions or constructs (such as commutative diagrams, projective limits, . . . ) can be built using the computation modules to model the objects and morphisms of the categorical constructions (as explained below).

In some embodiments a random signal generator can be configured to provide random signals to at least some of the artificial neurons of at least some of the computation modules to enhance unsupervised learning capacity of the data processing device.

With respect to the at least one data hub process and the plurality of processes in form of computation modules (in the following in short "computation modules") the following can be stated:

Data Hub Process:

The data hub process has an important role with respect to the flow of data in the data processing device. In the prior art it is common that input data is processed in a linear way, i.e., input data is inputted to a process which may include several parallel and sequential sub-processes and the output of the process can be used as input for other processes or can be outputted via an interface. A plurality of such linear processes might run in parallel. It is to be understood that the different sub-processes (structures) of the data hub process can run completely independently from each other such that they could also be viewed as processes in their own right instead of sub-processes of a bigger structure, i.e., of the data hub process.

In a data processing device according to the invention, input data is reviewed by the at least one data hub process and—if the input data is not already present in form of data segments (e.g., such as individual video frames of a video stream or the like)—, uses at least one segmentation sub-process to segment the input data into data segments, which are provided with keys by at least one keying sub-process creating keyed data segments. The keyed data segments are stored in the at least one shared memory device (at any given time there might be none or a single segmentation sub-process or keying sub-process or a plurality of segmentation sub-processes or keying sub-processes, a different number of segmentation or keying sub-processes might be present at different times).

Segmentation of the input data to create segmented input data, in case the input data is not already present in segmented form, can be done in different ways, e.g., using supervised learning of one or more neuronal networks. By way of example, if the input data is natural language (in written or spoken form) it could be advantageous if a neuronal network of the data hub process is trained by supervised learning to distinguish between individual words or letters (be they in written or spoken form) and to segment the input data accordingly, such that. e.g., each word of a sentence (input data) forms segmented input data. This type of segmentation would be advantageous with respect to alphabet-based languages such as languages belonging to the indogermanic family of languages. With respect to languages which use a logographic system instead of an alphabetic system for their written form (such as, e.g., Chinese), segmentation according to logographic elements would be advantageous.

Depending on how specific an embodiment of a data processing device should be with respect to possible input data, generation of keys can be more or less specific.

By way of example, generation of keys could be done such that, depending on the number of computation modules and/or computational groups of computation modules present, one specific key is computed by the at least one data hub process for each computation module or computational group and data segments are randomly provided with one of the keys. It can be readily understood that this is not the most efficient way to work but it might be sufficient for some embodiments.

By way of a preferred example, generation of keys is done in a more specific way, employing machine learning techniques such as neuronal networks in some embodiments. In these embodiments, during training, the at least one data hub process is presented with training data in the form of different input data and learns different keys depending on the input data. In some embodiments the input data might be in the form of visual data representing different kinds of objects such as "box", "ball", "cat", . . . and the at least one data hub process might compute a "box"-key, a "ball"-key, a "cat"-key, . . . . In these embodiments, a first computation module or computational group of computation modules would have been trained (in a supervised and/or unsupervised way) to recognize an object in a first form (e.g., in the form of a "ball"), a different computation module or computational group of computation modules would have been trained (in a supervised and/or unsupervised way) to recognize an object in a second form (e.g., in the form of a "box"), . . . . In some embodiments one or more ART networks (adaptive resonance theory network) could be used as machine learning technique in the at least one data hub process.

Once a keyed data segment has been loaded by one or more computation modules it can be deleted from the shared memory device to save memory space. It has to be noted that even if a keyed data segment is deleted the data hub process retains the information which keyed data segments were segmented from the same input data.

It should be noted that a key does not have to be present as distinctive code. A key might also be present in the data segment itself or be represented by the structure of the data segment or could be represented by morphisms between the input data and the individual data segment. Therefore, the term "keyed" data segment is to be understood to mean a data segment which can be recognized by at least one computation module as module-specific.

In some embodiments tolerance parameters can be given to determine when a key is at least approximately matching for a specific computation module and/or computational group and/or meta-group. In some embodiments these tolerance parameters can be provided by a routing process.

The at least one data hub process keeps information regarding which shared keyed data segments were segmented from the same input data (this can be done in different ways, e.g., by way of the keys or by separate identifiers or by use of categorical constructs such as a projective limit) if segmentation happened within the data processing device. The keys themselves, if present as distinctive code, can be small (e.g., amounting to only a few bits, e.g., 30-40 bits).

In some embodiments at least one routing process is present (which can form part of the data hub process as a sub-process or can be provided separately from the data hub process), which directs output provided by at least one of the computation modules to at least one other computation module. In other words, the process output of a computation module can be directed to that other computation module which can best deal with this output.

In some embodiments the routing process can be used to provide tolerance parameters to neuronal networks of computation modules.

In some embodiments the routing process can be used to repeatedly check the weights of synapses of neuronal networks of the computation modules to make sure that they do not diverge (e.g., whether they reside in an interval such as [−1, 1] with a certain desired distribution or whether they diverge from that distribution). In case it finds divergence in one or more neuronal networks of a computation module (which makes this computation module problematic) it can transfer the processes being run by the problematic computation module to a different computation module and can reset the weights of the problematic computation module. For this it is useful if the routing process is provided with a real time clock. In some embodiments the checking of the weights of synapses could be performed by another component of the data processing device or a dedicated weight analysing device.

Computation Modules:

The computation modules do not receive all of the input data indiscriminately but are configured such that they know to process only data keyed with a key specific to a given computation module (module-specific data segments). The computation modules check repeatedly (can be done in a synchronous or asynchronous way) whether there is any module-specific data segment stored in the shared memory device. If a data segment with a fitting key, i.e., a module-specific data segment, is detected, the computation module loads the module-specific keyed data segment and starts the data analysis process for which it is configured. In this way, although there is a plurality of threads or sub-processes running to check for module-specific data, computationally intensive tasks such as the computation processes of the neuronal networks are only started when module-specific data segments have been detected, otherwise a computation module can stay idle.

By way of example it is possible that a computation module has identified that a data segment represents pictorial data, e.g., showing a body having a hole, and knows that such pictorial data has to be mapped to a specific group of other computation modules. By way of another example, a computation module might have identified that a data segment represents language and knows that such language data is to be mapped to a specific group of other computation modules which then can understand the meaning of the language data. By way of yet another example, a computation module might interpret its module-specific data as representing an animal and separates the data into data components such as eyes, limbs, tail, . . . and sends the different components to different computation modules, which can then further analyse the data components.

In some embodiments, sending data from one computation module to another computation module can be done directly via connections between computation modules (these can be a simple signalling connection or can themselves comprise one or more computation modules) and/or via one of the data hub processes and/or via routing processes and/or via the shared memory. In an information-point-of-view the connection between different categories can be thought of by using the concept of a fibred category, i.e., a category connected to a base or index category. Two categories can be connected by connecting their base or index categories.

Data analysis inside a computation module is executed using a machine learning method in the form of at least one artificial neuronal network. Any kind of neuronal network known in the art might be configured in a given computation module and different computation modules can have different neuronal networks configured. Output of a specific computation module can be inputted to other computation modules and/or sent to the data hub process(es). It is an advantage of the invention that, usually, the neuronal networks employed in the computation modules can be relatively shallow in the sense of comprising a small to moderate number of layers, e.g., 10 to 15 layers, and can comprise relatively few artificial neurons in total, e.g., 5 to 150 neurons per layer, in some embodiments up to 1000 neurons.

It must be stressed that in the following description the language is sometimes described using biological concepts. This, however, only serves to make description easier. In reality, all of the following concepts are configured as computer code for execution by a CPU and the concepts discussed in the following such as synapse, axon, neuron body, . . . could be, e.g., classes in an object-based programming language such as C++ or Java.

A single computation module comprises at least one artificial neuronal network of any known type (such as a MfNN, RNN, LSTM, . . . ) which comprises a plurality of artificial neurons. Each artificial neuron (in the following in short: “neuron”) has at least one (usually a plurality of) synapse for obtaining a signal and at least one axon (in some embodiments a single axon can have a plurality of branchings) for sending a signal. Usually, each neuron obtains a plurality of signals from other neurons or an input interface of the neuronal network via a plurality of synapses and sends a single signal to a plurality of other neurons or an output interface of the neuronal network. A neuron body is arranged between the synapse(s) and the axon(s) and comprises at least an integration function for integrating the obtained signals according to the art and an activation function according to the art to decide whether a signal is to be sent by this neuron in reaction to the obtained signals. Any activation function of the art can be used such as a step-function, a sigmoid function.

As known in the art, the signals obtained via the synapses can be weighted by weight factors. Individual weight factors can be provided by a weight storage which might form part of a single computation module or could be configured separately from the computation modules and, in the latter case, could provide individual weights to a plurality (or possibly all) of the neuronal networks of the computation modules, e.g., via the shared memory and/or the routing process. These weights can be determined as known in the art. e.g., during a training phase by modifying a pre-given set of weights such that a desired result is given by the neuronal network with a required accuracy. Other techniques could be used.

As is known in the art, input signals and weights and output signals do not have to be in the format of scalars but can be defined as vectors or higher-dimensional tensors.

In some embodiments the neuron body can comprise a receptor for obtaining a random signal which is generated outside of the neuronal network (and, preferably, outside of the computation module). This random signal can be used in connection with the creation of new concepts which will be discussed in a later section of the present disclosure.

The neurons of a neuronal network can be arranged in layers (which are not to be confused with the vertical layers (cf. FIG. 3) of a computation module if the computation module has a hierarchical architecture).

In some embodiments, the layers of the neuronal network will not be fully connected.

In one embodiment the computational groups themselves could be organized into meta-groups. In some embodiments there could be keys for the data segments which signify that these data segments are specific for a meta-group. Such keys can be provided in addition to those keys which are specific for individual computation modules and/or which are specific for individual computational groups.

Mathematically, the computational groups can be represented by tensorial products $\otimes_k \otimes \otimes_l C_{k,l}$ of a number n×m of computation modules $C_{k,l}$, wherein, e.g., a first computational group is given by k=1, . . . , n−p and l=1, . . . , m−q and another computational group is given by k=n−p+1, . . . , n and l=m−q+1, . . . , m. If the computational groups are organized into meta-groups, these meta-groups can also be mathematically represented by tensorial products.

Configuration of a computation module for data of a given kind can be done, e.g., by choosing the type of neuronal network to be used (e.g., classical or Quantum general ANNs or more specific ANNs like MfNN—Multi-layer Feed-Forward NNs for pictorial or video data, RNNs such as LSTMs for analysis of sound data, . . . ) and/or the specific setup of the neuronal networks to be used (e.g., which training data a neuronal network is trained with, the number of layers in the neuronal network, the number of neurons, . . . ).

In some embodiments a computation module can have a hierarchical structure (forming a vertical type of organization) meaning that a computation module can have function-specific layers (which can be thought of to be vertically-stacked). It is possible that all computation module and/or that computation modules of a given computational group or meta-group have the same hierarchical structure and/or that the hierarchical structure varies from computational group to computational group and/or meta-group to meta-group.

By way of example, a first layer (counting from the top of the stack) of the hierarchical structure can be used to receive module-specific data and to process this data to prepare it for the machine learning method specific to the computation module. Another layer which is connected to the first layer (possibly by way of one or several intermediate layers such that it receives data from the first layer and, possibly, the intermediate layer(s)) can include at least one neuronal network which processes data provided by the first layer (and possibly intermediate layer(s)) and outputs the result of the executed machine learning method to the at least one shared memory device and/or at least one other computation module and/or to the at least one data hub process and/or routing processes. At least one more layer can be provided after the layer containing the at least one neuronal network which can use machine learning methods (e.g., in the form of a neuronal network) to determine where data processed by the at least one neuronal network of the previous layer should be sent to.

In some embodiments the first layer can be used to process the module-specific data by applying a topological down-transforming process. After initial configuration a neuronal network requires input data of constant size, e.g., an input vector of size 10.000. In the prior art, if the input vector is larger it is cut-off, if it is smaller padding can be used. In contrast, topological down-transformation provides input with the correct size for a given neuronal network.

In some embodiments a computation module can have at least six layers I-VI having, e.g., the following functions regarding data analysis and interaction (nb., if categorical constructs are used, the layers can be connected together via morphisms):

Layer I is configured to process module-specific keyed data segments obtained from shared memory and/or the data hub process such as a target vector. This layer can prepare data to be better suited for processing by the at least one neuronal network, e.g., by topological down transformation. It can send this data to layers II and III.

Layers II and III can comprise at least one neuronal network each, each of which processes data obtained from layer I and, possibly, from other computational modules. These are the layers where machine learning can take place to process data during data analysis in a cognitive way using well-known backpropagating neuronal networks such as general ANNs or more specific ANNs like MfNNs, LSTMs, . . . (here synaptic weights are modified during training to learn pictures, words, . . . ). In some embodiments, these layers can also receive information from at least one other computation module, e.g., from layers V or VI of the at least one other computation module. In some embodiments, layer III contains at least one neuronal network which receives random signals as described below.

Layer IV can comprise at least one neuronal network which, however, is not used for cognitive data processing but to transform data from the data hub process or shared memory such as an input vector, e.g., by topological down transformation. It can send this data to layers II and III.

In layers V and VI neuronal networks (e.g., of the general type present in layers II and III) can be present which can be used to learn whether information represented by data is better suited to be processed in a different computation module and can be used to send this data accordingly to the data hub process and/or the shared memory and/or routing processes and/or directly to another computation module where this data can be inputted, e.g., in layers II or III.

The vertical organization of computation modules can be present together with the horizontal organization or also if there is no horizontal organization present.

A computation module can consist of one or several sub-modules, at least on one of the possibly several layers or on all layers, in the sense that parallel computation can take place in a computation module. By way of example, one computation module could comprise more than one sub-module, wherein each sub-module contains a different neuronal network. The different sub-modules can be active in parallel or only one or more of the sub-modules might be active at a given time, e.g., if a module specific data segment calls for it.

It is to be understood that from the viewpoint of a programmer a computation module is a certain structure of the programming language the computer program is programmed in. By way of example, if C++ is used as language, a computation module could be a C++ class (not as a data container but encoding a process) having pointers to other C++ classes representing other computation modules, data hub processes, . . . . Each C++ class representing a computation module can comprise other C++θclasses representing the components of the computation module such as the neuronal network(s) of the computation module. After starting the program the processes encoding the computation modules, the data hub processes and possible other components will run idly until input data is provided via the at least one first interface.

With respect to execution of the computation modules by the at least one computing device of the data processing device it can be provided, with respect to an embodiment, that each computation module forms one thread. With respect to a single computation module each computational entity of that computation module such as a neuronal network this entity can be executed by a single CPU or core of a CPU or by several CPUs or cores of one or several CPUs, depending on the complexity of the entity.

A Brief Description of a Possible Embodiment of the Invention:

Input Data is provided by a data capturing device. e.g., in the form of pictures, language, sounds, etc. This input data is provided via at least one first interface to at least one data hub process, in some embodiment via shared memory, which segments the input data into keyed data segments. A plurality of computation modules checks repeatedly whether there is any data present in the data hub process and/or the shared memory with a matching key (tolerance parameters can be given to determine when a key is at least approximately matching). If yes, the data segment which is keyed with this key is loaded into the fitting computation module(s). In dependence on the loaded keyed data segment(s) and, in some embodiments, with a requested tolerance, the computation module(s) generate(s) output using at least one machine learning method, the output being, e.g., a classification result for the loaded keyed data segment. At least one other computation module loads the output (both computation modules are connected directly and/or via the shared memory and/or via at least one data hub process, and/or via routing processes and the "other" computation module always checks the connected computation modules and/or the shared memory and/or the at least one data hub process and/or via routing processes) and by at least one machine learning method maps the input to an output specific for this computation module (the computation module has been trained to do this mapping during training). After a number of cycles, the data processing device will output data via at least one second interface, e.g., some (possibly group of) computation module(s) might recognize that the input data contains a command and outputs said command via the at least one second interface.

By way of example, the data processing device can be used to control a robot arm which is supposed to grab objects having a certain shape (e.g., box-shaped) but not objects of a different shape (e.g., ball-shaped). The objects are transported by a conveyor and the objects are placed on the conveyor in different orientations and might be more or less damaged. Input data is provided to the data processing device by one or more cameras connected to the at least one first interface. The output of the data processing device via the at least one second interface is a command to the robot arm to grab a certain object or not. In order for this to be possible, the data processing device must generalize from a specific object provided on the conveyor with a specific orientation to a class of objects having a certain shape (e.g., box-shaped).

In this example the camera signals are inputted via the at least one first interface into the data processing device and are made available to the data hub process, which segments the input data and provides keys to the input data. Segmentation of input data could, e.g., happen based on image interpretation and classification by the data hub process using well-established machine learning methods, which allow identification and classification of the structure present in a camera image, e.g., in order to segment input data representing the conveyor belt from input data representing objects on the conveyor belt, e.g., boxes on the conveyor belt.

In a different example, concerning natural language interpretation, input data could be segmented by the data hub process using well-established machine learning methods which allow identification and classification of the structure present in an audio stream, e.g., individual phonemes, syllables, words, phrases or clauses.

In general, a key provided by the data hub process to a data segment creating a keyed data segment will be determined by the data hub process such that those computation modules, which are especially suited for processing the data segment, can find this specific keyed data segment and other computation modules, which are not suited for processing the data segment, know to ignore this data segment, thus shortening the time needed to process the data segment.

In the example with box-shaped objects on a conveyor, there will be different pluralities of computation modules configured to process data representing different kinds of objects, such as boxes, balls, . . . . In this example one of the keys could signify "box" or "box-shaped", another key could signify "ball" or "ball-shaped", and so on.

In the course of data analysis, it might become necessary for the data hub process to change the key of a keyed data segment, advantageously taking into account additional information provided by one or more computation modules. By way of example the input data is keyed as "ball" by the data hub process because the box shown in the camera picture is damaged in such a way that to some extent it resembles a ball and the data hub process has provided the "ball" key to this data segment. The computation module which is configured for "ball" loads the data, deletes the key, applies machine learning methods and sees that the object is not a ball. The computation module returns this data segment with the additional information "not a ball" to the shared memory or directly to the data hub process. The data hub process computes a different key taking into account the additional information "not a ball", e.g., a key signifying "box" and every computation module which is of the opinion that this might be an object for which it is responsible checks whether this is in fact such an object.

In case one of the computation modules realizes that the object is a damaged box this module outputs "damaged box" to other computation modules. In the end a specialized group of computation modules acts on this information and causes the robot arm to grab the damaged box.

Speaking generally without restriction to a specific embodiment, the computation modules can be organized into computational groups wherein each computational group contains several hundreds, thousands, ten-thousands or more computation modules which are configured to analyse data of a given kind and/or to perform specific tasks. By way of example, one such computational group could consist of computation modules which are configured to analyse pictorial or video data, another group might consist of computation modules which are configured to analyse sound, yet another group might consist of computation modules which are configured to generate control commands for a device to be controlled by the data processing device. The data hub process(es) can prepare the keyed data segments such that it is clear which keyed data segments belong to which computational group. This way of organization can be called horizontal organization of modules because the modules are on the same hierarchical level.

In some embodiments there could be keys for the data segments which signify that these data segments are specific for a computational group. Such keys can be provided in addition to those keys which are specific for individual computation modules.

Representation of Categorical Structures by Data Processing Device:

In a preferred embodiment of the invention the computation modules are used to represent structures which can be modelled mathematically using category theory. In the language of category theory one or more computation module can represent one or more categories, object(s) of categories or morphism(s) of categories. One or more computation module can represent a functor (a map between categories) or a natural transformation (a map between functors) or universal objects (such as projective limit, pullback, push-out, . . . ). A big advantage of the use of categorical constructs is that the data processing device does not need to contain an internal database (although, in some embodiments, it is possible for the data processing device to access external databases, e.g., to verify new concepts created by the data processing device or to get supervision for a step of supervised learning). Large databases tend to be very hardware intensive and the more complex the data to be processed the more detailed and, hence, large a database has to be. The use of categorical constructs in connection with a plurality of co-running computation modules allows the processing of complex data without having the hardware requirements that would be present if a database were to be used. Furthermore, using categorical constructs allows to represent logical connections. Flow of information can be handled in an efficient way using connections which can be modelled by categorical constructs. Other than a database, in some embodiments, the data processing device can create and learn new concepts.

Composition of morphisms can be used to represent processes and/or concepts sequentially.

Tensor products can be used to represent processes and/or concepts parallelly.

Functors can be used to map structures and/or concepts from one category to another category.

Natural transformations can be used to map one functor to another functor.

Commutative diagrams can be used to learn unknown concepts (with or without supervision) which form part of a commutative diagram if enough of the other elements of the commutative diagram are known.

A combination and/or composition of morphisms, tensor products, functors, natural transformations and/or commutative diagrams and/or of the other categorical constructs described in this disclosure can be used to learn new concepts (with or without supervision) by using a network of diagrams.

By way of example the data processing device can be configured such that there is a plurality of categories present wherein each category is represented by a plurality of interconnected computation modules or a single computation module. The interconnection can be done by composition of morphisms or functors (directly or, in case of fibred categories, via their base categories) which, in programming language, means that the language constructions representing the computation modules in a chosen programming language are suitably interconnected by the means provided by the chosen language, e.g., using pointers between classes.

Structures of the data hub process such as, e.g., the routing process, can be modelled, e.g., as a morphism or functor between categories which, in turn, are modeled by computation modules or groups of computation modules and/or by other structures of the data hub process.

By way of example, data analysis using categorical constructs can be done in the following way:

Suppose input data $ID_1$ and $ID_2$ is present in segmented form $$[KS_1^1, \ldots, KS_k^1]$$

and $$[KS_1^2, \ldots, KS_k^2]$$

such that data segment $$KS_i^1/KS_i^2$$

is specific to a first/second group of computation modules $$C_{n,m}^1/C_{o,p}^2$$

(created by the at least one data hub process or already present in segmented form in the input data) in the shared memory. Computation modules $$C_{n,m}^1$$

of the first group, upon checking the content of the shared memory, see and extract keyed data segment $$KS_i^1,$$

computation modules $$C_{o,p}^2$$

of a second group, upon checking the content of the shared memory, see and extract keyed data segments $$KS_i^2$$

and computation modules $$C_{o,p}^3$$

of a third group, upon checking the content of the shared memory, see that there is no module-specific data present. For simplicity it is assumed in this example that a keyed data segment is specific to a single group of computation modules only, in most embodiments it might be specific to a plurality of groups of computation modules which, together, might represent a categorical construct such as an object or a morphism. Additionally or alternatively, more specific keys can be used which are not only specific for a group of computation modules but for single computation modules.

Once a module-specific data segment $$KS_i^1$$

has been loaded by a computation module $$C_{l,m}^1$$

this computation module can, e.g., check whether this data segment corresponds to an object $A_k$ of the category $\mathcal{A}$ represented by this computation module.

A computation module $$C_{l,m}^k$$

(or sometimes a plurality of computation modules) is said to represent an object $A_i$ of a category $\mathcal{A}$ in the sense that if provided with different versions of data segments $KS_1, \ldots KS_n$ which, e.g., all represent a box-shaped object when seen under different angles and/or if there is a deviation from the box-shape, e.g., because the box-shaped object has been somewhat deformed, then the computation module can be trained to recognize that all of these data segments refer to an "ideal object" $A_i$ (in the given example "box-shaped object"). In the same sense, another computation module is said to represent an object $B_i$ of a category $\mathcal{B}$ Once a computation module $$C_{l,m}^k$$

has identified that a data segment $KS_i$ corresponds to an object $A_i$ of the category $\mathcal{A}$ represented by this computation module, it depends on the configuration (either initial configuration or configuration after training) what its action upon identification of the object $A_i$ is. By way of example, it could simply send a message to another computation module $$C_{u,v}^i$$

such that the other computation module can take an appropriate action and/or it could send a message to the data hub process which, in turn, could reroute this message to another computation module $$C_{o,p}^j.$$

If there are at least two computation modules present which, say, represent two different objects $A_1$, $A_2$ of a given category $\mathcal{A}$ a third computation module can be used to represent a morphism $a_1$ in that category $\mathcal{A}$ between the two objects $A_1$, $A_2$ such that $$A_1 \xrightarrow{a_1} A_2.$$

Another computation module can represent another object $A_3$ of that category and a morphism $$A_1 \xrightarrow{a_3} A_3.$$

Another computation module can represent a further morphism $$A_2 \xrightarrow{a_2} A_3$$

thus completing the commutative diagram in which $a_2 \circ a_1 = a_3$. Whenever the data processing device has learned all but one part of the commutative diagram (object or morphism) it can use commutativity to find the missing part, e.g., if morphism $a_3$ is unknown or object $A_2$. In a sense, a commutative diagram can be understood to be an equation which allows computation of a missing variable of the equation (of course, more complex commutative diagrams can be built using this elementary commutative diagram).

By way of example, if $A_1$ represents the person "Anne", $A_2$ represents "a school", $A_3$ represents "a student", $a_1$ represents "attends" and $a_2$ represents "is attended by", then the data processing device can learn the concept that "Anne" is "a student" because $a_2 \circ a_1 = a_3$ gives: "A school is attended by students" ∘ "Anne attends a school"="Anne is a student.", i.e., $a_3$="is".

If there are two categories $\mathcal{A}, \mathcal{B}$ represented, with objects $A_1$, $A_2$ and morphism f $$\left(A_1 \xrightarrow{f} A_2\right)$$

in category $\mathcal{A}$ and objects $B_1$, $B_2$ and morphism g $$\left(B_1 \xrightarrow{g} B_2\right)$$

in category $\mathcal{B}$, it is possible to have at least three categories represent a functor $\mathfrak{F}$ mapping objects and morphisms from category $\mathcal{A}$ to objects and morphisms in category $\mathcal{B}$ such that $\mathfrak{F}: A_1 \rightarrow B_1, A_2 \rightarrow B_2, f \rightarrow g$. This way, by using a total of at least 9 computation modules, a simple commutative diagram can be built wherein one computation module is used per object $A_1$, $A_2$, $B_1$, $B_2$ and per morphism f, g and three computation modules are used for the functor $\mathfrak{F}$ with the functor condition that, of course, $g \circ \mathfrak{F}(A_1) = \mathfrak{F} \circ f(A_1)$.

When the categorical constructions are built during initial configuration of the data processing device there is a plurality of categorical constructions which can be used by the data processing device in the unsupervised learning step to learn new concepts, e.g., in the following way:

Suppose that with respect to the exemplary commutative diagram given above, category $\mathcal{A}$ represents the category of "box-shaped" objects and category $\mathcal{B}$ represents the category of "tetrahedrons" such that $A_1$, $A_2$ are two boxes which are connected to each other by a rotation represented by morphism f, in other words, the data processing device has learned that a box which has been rotated is still the same box. Using functor $\mathfrak{F}$ this concept can be mapped to the category of "tetrahedrons" meaning it is not necessary for the data processing device to re-learn the concept of "rotation of a geometric object" in the category of "tetrahedrons".

Suppose that with respect to the exemplary functor given above, the first category is a "cat"-category in the sense that the objects of $\mathcal{A}$ represent "cats" (e.g. $A_1$ represents a specific cat shown in an image), $A_2$ represents "baby of cat" and f represents the mapping "cat gives birth to" and the second category is a "mammal"-category in the sense that the objects of $\mathcal{B}$, e.g, $B_1$, represent different kinds of "mammals" and $B_2$ represents "baby of mammal" and the functor $\mathfrak{F}$ maps from the "cat"-category to the "mammal"-category. Let us further assume that the morphism g is not yet known to the data processing device. Because in a commutative diagram the composition $g \circ \mathfrak{F}(A_1)$ must give the same result as the composition $\mathfrak{F} \circ f(A_1)$, namely $B_2$, the data processing device can learn that the morphism g represents "mammal gives birth to".

Alternatively, if only $B_1$ had been unknown but both morphisms f,g had been known, the data processing device would have concluded that $B_1$ must represent "mammal".

The technique to find unknown quantities that form part of a—possibly very complex—commutative diagram is sometimes colloquially called "diagram chasing".

The above examples, although of interest to the invention, are of course very simple. More complex categorical constructions can be used, such as, e.g., a pullback or pushout, a projective limit (sometimes the projective limit is also called inverse limit or indirect limit) or an inductive limit (sometimes called direct limit) or a sub-object classifier.

One and the some categorical construct can be used for different functions (wherein each function will be represented by different groups of computation modules), e.g., the projective limit could be used to distribute data to different structures in the data processing unit (routing), create new concepts using random signals and/or approximately represent the universal quantifier.

With respect to the routing process, e.g., of the data hub process and/or by individual computation modules and/or groups of computation modules, to analyse data by sending it to different computation modules the projective limit can be used, e.g., as follows:

Data which is to be interpreted is inputted to a computation module (depending on the complexity of the data it will, in practice, often have to be a group of computation modules) which is interpreted to represent the projective limit of the data which is interpreted to consist of a sequence of data segments $$A_1 \overset{a_1}{\leftarrow} A_2 \overset{a_2}{\leftarrow} \dots \xleftarrow{a_{n=k-1}} A_{n=k}.$$

The projective limit is the object $$\varprojlim A_i$$

together with morphisms $\pi_i$ which means that the sequence $A_{n=1}, \dots, A_{n=k}$ is projected onto its ith member $A_{n=i}$. It can be remembered how the data X was segmented, e.g., by use of the projection morphisms $\pi_i$ and morphisms $a_i$.

By way of example, assume the data processing device must interpret the meaning of some data X. Depending on the complexity of data X, a single computation module will not have sufficient complexity to calculate the meaning of data X. Therefore, data X is being sent to different computation modules (or groups of computation modules) and each computation module tries to find out whether it knows the meaning of data X. If a computation module finds that it knows (at least part of) the data X it can provide this information, either to the computation module which initially sent data X or, preferably, to a structure which can gather the responses of the different computation modules such as the routing process. If the computation modules finds that it does not know data X it can send data X to a different group of computation modules (or a single computation module) to let them check the data X. This process can be facilitated by interpreting data X as the projective limit $$\varprojlim A_i$$

wherein the projection morphisms $\pi_i$ can be used to distribute the data X to different computation modules in the form of segments $A_{n=i}$ and the logical connection between the different data segments is preserved by the morphisms $a_i$. If data is to be sent to computation modules of a different category, say from category $\mathcal{A}$ to category $\mathcal{C}$ computation modules representing a functor $\mathfrak{F}$ between these categories can be used.

How a computation module can find out whether it knows some data or a data segment can be understood by remembering that a computation module represents an object $A_i$ in a category $\mathcal{A}$ and therefore the neuronal network(s) contained by the computation module can compare whether data X is at least isomorphic (i.e., similar, in other words, approximately equal) to the object $A_i$ represented by that computation module.

If computation modules having a vertical hierarchical structure are used, the projection of data segments to other objects could be done, e.g., in layers V and VI.

In preferred embodiments the data processing device is enabled to create new concepts itself, such as, e.g., a new geometrical object (which, e.g., is a fusion of two octahedrons or a ball having a hole) or a sentence such as "Cat wins US presidential election". Such a new concept does not necessarily need to make sense as evidenced by the given exemplary sentence. However, by checking the new concept with concepts that are already known by the data processing device to make sense, such as, e.g., geometrical objects in different shapes or different sentences concerning cats, it will often be able to decide for itself whether a new concept makes sense. It might, however, be necessary in some cases to obtain external input to decide whether a new concept makes sense, e.g., by asking an operator of the data processing device or accessing an external database. In other words, "creation of new concepts itself" means that these new concepts are logically derived from input data or from analysis of input data.

In some embodiments creating new concepts can be done by inputting a random signal generated by a random signal generator to a receptor of a neuron. This random signal can be inputted to the result of the integration function to modify (e.g., by adding or multiplying) that result such that the activation function operates on the modified result. In this way, a neuronal network which is inputted with information will base its computation not on the inputted information alone but on the modified result. By this mechanism the information or concept which is represented by the neuronal network will be changed in unforeseeable ways. In most cases the changed information will be wrong or useless. In some cases, however, the new information or concept will be considered to be useful, e.g., to create new categorical constructs. The random signal generator does not need to form part of the data processing device, although this is certainly possible, but can be an external device which can be connected to the data processing device. In some embodiments, the random signal generator will generate random signals in the form of random numbers taken from an interval, e.g., [0, 1]. Preferably, the random signals are sent not at regular time intervals but according to a Poisson distribution.

In case a new concept is found to be useful the data processing device can train one or more computation modules to learn this new concept. The new concept can be stored by the routing process until one or more computation modules have been trained.

In some embodiments only some of the neurons of a neuronal network will be provided with a random signal, preferably those neurons which are more upstream with respect to the direction of information flow in the neuronal network. By way of example, in a layered neuronal network, the first or first and second layers after the input interface of the neuronal network might be provided with a random signal while the neurons of the remaining layers will work in the way known in the art, i.e., without the input of random signals.

The concept of inputting a random signal into the neuron body should not be confused with the concept of inputting (e.g., adding or multiplying) random signals to the weights of the synapses of a neuron. This concept can also be applied with respect to the invention, irrespective of the question whether random signals are inputted to the neuron body or not.

In some embodiments the creation of new concepts by using random signals is done by at least one plurality of computation modules which represent a projective limit.

In those embodiments which make use of random signals to create new concepts, at least two different plurality of computation modules are present: at least one plurality which is used to analyse data and at least one plurality to create new concepts. The size of the former plurality will be larger than the size of the latter plurality. While the at least one plurality used for analysing data will run idly most of the time and will only do computational work if module-specific data is present, the at least one plurality used to create new concepts will do more or less continuous work. In some embodiments, it might therefore be advantageous to transfer newly learned concepts to other computation modules to store them in order to free those computation modules used to create new concepts.

Training of Data Processing Device:

Training of the data processing device after configuration is done in part in a supervised way and, in some embodiments (e.g., those with categorical constructs), in part in an unsupervised way and, in some embodiments using creation of new concepts. Training can be done in some embodiments partly before inference operation of the data processing device and partly during the inference operation as explained in the following:

The supervised training step can, in a first aspect, be done with respect to at least some of the neuronal networks in the usual way by providing training data, comparing the created output with a target output and adapting the neuronal networks to better approximate the target output by the created output, e.g., with back-propagation, until a desired degree of accuracy is reached. This is usually done before inference operation of the data processing device. Training the at least one data hub process with respect to segmentation and/or keying and/or routing can also be done during this stage.

In a second aspect, supervised training can be done differently from the prior art: By way of example assume the sentence "John works here" is inputted via the first interface. The data processing device has categories for names and locations, e.g., in the "names" category different names are represented by objects such as "Mary". "Jim" and so on while in the "locations" category different places are represented by objects such as "company A", "company B", "home of Mary", "home of Jim" and so on. The verb "work" could be represented by a first functor between the "names" category and those objects of the "locations" category which represent companies and a second functor between the "names" category and a category the objects of which represent different positions in a company, such as "manager", "assistant" and so on. There is also a category of sentences the objects of which are sentences. Connections between objects of the same category are represented by morphisms while connections between different categories are represented by functors, e.g., a functor might connect the object "Mary" to "home of Mary" and to further information relating "Mary" in other categories, and connections between functors are represented by natural transformations as is well known in category theory. The "names" category might be connected to another category with possible attributes that might be connected to the names, e.g., a distinction between male and female names. Functors can be mapped onto each other using natural transformations.

Let us assume that the data processing device has not yet learned the meaning of "John" and the meaning of "here". Upon trying to resolve the meaning of the sentence "John works here" by inputting "John" and "here" into a functor (actually a bi-functor) which maps to a category of sentences, it realizes that "John" is a name for a male person, that "work" is something connected to a specific position in a specific company and "here" is supposed to be a specific object in the category of locations but it does not know what position "John" has and which company is meant by "here". This prompts the data processing device to output two questions via the second interface, namely, "In which company does John work?" and "What position in the company does John have?". Once these questions have been answered by a human supervisor or by consulting an external database (e.g., "John is a manager in company B") the data processing device will configure as many computation modules as necessary to store the newly learned information in the form of objects and morphisms in the correct categories. Another question might be "Where does John live?". Once the questions regarding "John" have been answered the data processing device can train a natural transformation between the functors that represent "work" and "live" because both concepts make sense with respect to "John".

Unsupervised training can, in some embodiments, happen using commutating diagrams which are represented by computation modules in the way described above. In some embodiments, unsupervised training can also happen due to the input of random signals and the creation of new concepts as described above.

By way of example one computation module or computational group of computation modules could be trained to recognize a first kind of object (e.g., "box") in the following way:

Learning data showing different embodiments of the first kind of object is inputted via the at least one first interface to the at least one data hub process, in some embodiment via the shared memory, which—if necessary—segments the input data into keyed data segments. A plurality of computation modules checks repeatedly whether there is any data present in the data hub process and/or the shared memory with a matching key (tolerance parameters can be given to determine when a key is at least approximately matching). If there is a module-specific data segment present, the data segment which is keyed with this key is loaded into the fitting computation module(s). In dependence on the loaded keyed data segment(s) and, in some embodiments, with a requested tolerance, the computation module(s) generate(s) output using at least one machine learning method, the output being, e.g., a classification result for the loaded keyed data segment. This output data is used in the usual way of supervised learning by the neuronal network(s) of the computation module(s) to train the neuronal network(s) by a technique known in the art, e.g., back-propagation.

Training of another computation module or computational group of computation modules to recognize a second kind of object (e.g., "ball-shaped object") can be done in the same way.

Of course, the same training can be done for other kinds of data such as, e.g., data representing natural language, where a first computation module or computational group of computation modules could be trained to recognize a first language structure, a second computation module or computational group of computation modules could be trained to recognize a second language structure, . . . .

At least one other computation module loads the output (both computation modules are connected directly and/or via the shared memory and/or via at least one data hub process, and the "other" computation module always checks the connected computation modules and/or the shared memory and/or the at least one data hub process) and by at least one machine learning method maps the input to an output specific for this computation module (the computation module has been trained to do this mapping during training).

In some embodiments the plurality of processes executed by the at least one computing device of the data processing device can comprise at least one auxiliary process providing learning parameters neuronal networks which might be different for different kinds of data. Also, during training the computation modules can be provided with tolerance parameters ($\eta_i$, . . . , $\eta_n$, determining precision of output) for neuronal network present in the computation module.

In some embodiments the unsupervised training step happens with respect to the number of pre-built categorical constructions. This can happen before and/or during inference operation of the data processing device.

In some embodiments each computation module is pre-trained to do a specific mapping in which a loaded input is mapped onto an output which is represented by this computation module.

In some embodiments each computation module is configured to execute a machine learning method on the module-specific data segments, said machine learning method comprising data interpretation and classification methods using at least one pre-trained neuronal network. Training of the at least one neuronal network can be done in the usual way by supervised learning in which a input data is provided as a training vector and the parameters of the at least one neuronal network are changed until the output data corresponds to an expected output within an acceptable error tolerance or in the other way described above.

Since it might happen that the data processing device learns wrong concepts, it might be helpful, in some embodiments, to check from time to time what the data processing device has learned, e.g., by asking the data processing device questions like "Where can people live?" and if the answer of the data processing device contains a wrong answer such as "People live in companies," to tell the data processing device to delete this wrong information.

Using categorical constructs, i.e., projective limits, it is possible, in some embodiments, to approximately represent the universal quantifier ∀ which is something that could not be done in the prior art using isolated neuronal networks:

A projective limit is represented by a plurality of computation modules. Random signals are generated by a random signal generator and are used to generate new concepts in the form of test data by at least some of the neuronal networks of the computation modules of the projective limit. Of course, it is impossible to exactly represent a quantifier like ∀ which—by definition—must hold true for an infinite number of elements in a finite system. Therefore, infinity is simulated by inputting the random signals to stochastically create test data which, approximately, can be thought of as having the same effect as if there were an infinite number of test data from which elements can be chosen. In this sense, the randomly (stochastically) generated test data can be thought of simulating the universal quantifier ∀ in the following sense:

Suppose the computation modules representing the projective limit have learned some facts. e.g., regarding prime numbers, which they use to formulate a hypothesis (e.g., for all natural numbers there is a larger natural number which is prime). Then, using a multitude of test data which is stochastically generated, they can check whether the hypothesis is true with respect to a given predicate, e.g., whether it is true that for each natural number of the test data there is a larger natural number which is prime. Of course, this is not a mathematical proof in the traditional sense. Rather the reasoning is, that if a hypothesis is checked for a very large number of test data and holds true for each of the test data, it might as well be considered true for all possible data.

In this way, in some embodiments, unsupervised learning can take place even without checking with an external reference such as a human operator or an external database. Checking can be, e.g., done using other computation modules, in particular computational modules which, together, represent an inductive limit which can be viewed as an existential quantifier 3 of natural logic (cf. FIG. 22*b*).

Once a hypothesis has been checked in any suitable way it can be sent for representation to another group of computation modules to free the computational capacity of the computation modules for checking other hypothesis.

By using non-commuting morphisms or functors the data processing device can create a sense of temporal and/or spatial orientation:

E.g., data relating to time-ordered events which is inputted into the data processing device can be represented by a suitable number of categories (this is the information-point-of-view, in the technical-point-of-view a suitable number of computation modules has to be configured). In some embodiments, events which are inputted after another within a pre-determinable time span, e.g., between 0.1 seconds to 0.5 seconds, are represented in a connected way by connecting the base categories of the categories by non-commuting functors. Alternatively, the data processing device could be explicitly instructed to connect these events. In either way, causal relationships and temporal concepts such as "earlier" and "later" can be encoded, e.g., by functors between the categories.

Also, temporal sentences like "I will go to school tomorrow." can be analysed if the data processing device has been trained to recognize that "will" and "tomorrow" imply that there is a present and a future. This time ordering can be represented by categories which are connected via their bases as described above.

Similarly, the spatial relations of objects in an image or the like can be deduced and a categorical representation of these relations can be constructed by the data processing device by encoding the spatial relationships between these objects by using non-commuting functors between base categories of the categories representing those objects.

Another interesting example of a categorical construct that can be used in some embodiments is that of a sub-object classifier which allows the data processing device to deduce or define whether a given object is part of a bigger object.

As a general matter, it should be noted that one and the same categorical object can be represented by different computation modules during operation of the data processing device.

There is a difference between a physical-point-of-view of the data processing device 1 and a information-point-of-view. With respect to the former point of view the plurality of computation modules 7 can be viewed as a matrix (or a higher-dimensional tensor) in which each individual computation module 7 is addressed by an index, e.g., $C_{k,l}$. With respect to the latter point of view categorical constructs are present which are represented by one or more computation modules 7. By way of example, a category comprising 1000 objects and/or morphisms might be represented by a matrix of, e.g., 50×4 computation modules 7. In other words, a 1:1 correspondence between a computation module 7 and a categorical construct does not need to exist and, in most embodiments, will not exist.

Figure 1:
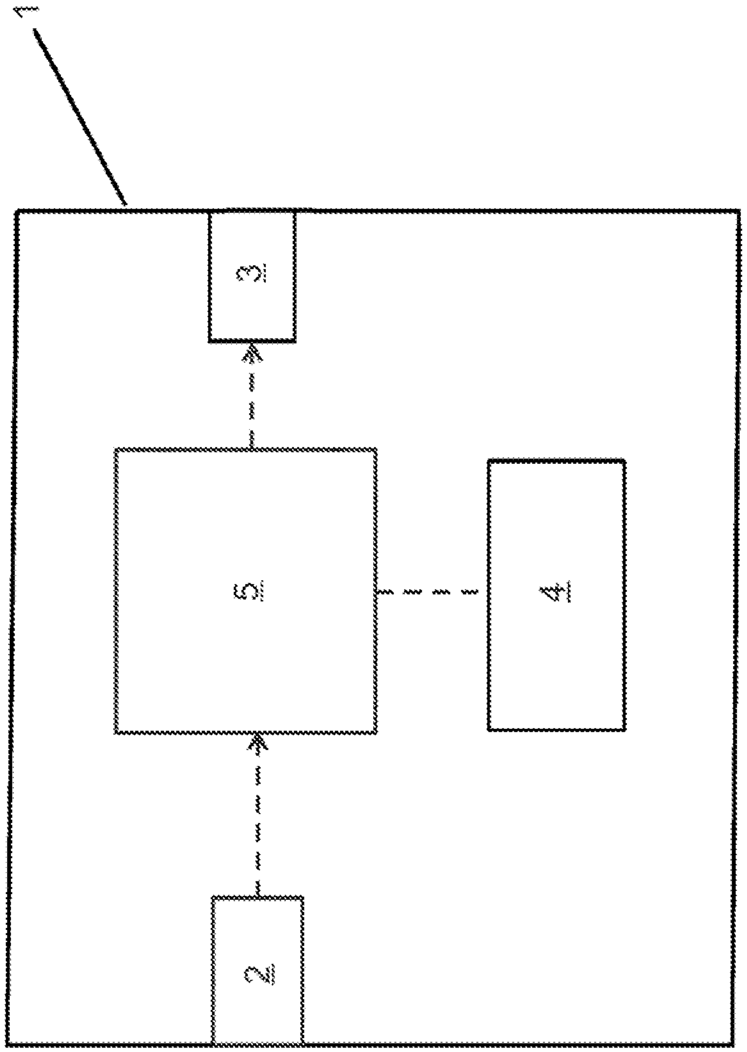
FIG. 1: a data processing device according to an embodiment of the invention

FIG. 1 shows an embodiment of a data processing device 1 comprising:

- at least one first interface 2 for receiving input data ID
- at least one second interface 3 for outputting output data OD
- at least one shared memory device 4 into which data can be written and read from
- at least one computing device 5 to which the at least one first interface 2 and the at least one second interface 3 and the at least one shared memory device 4 are connected and which is configured to:
- receive input data ID from the at least one first interface 2
- send output data OD to the at least one second interface 3
- read data from and write data into the at least one shared memory device 4

Figure 2:
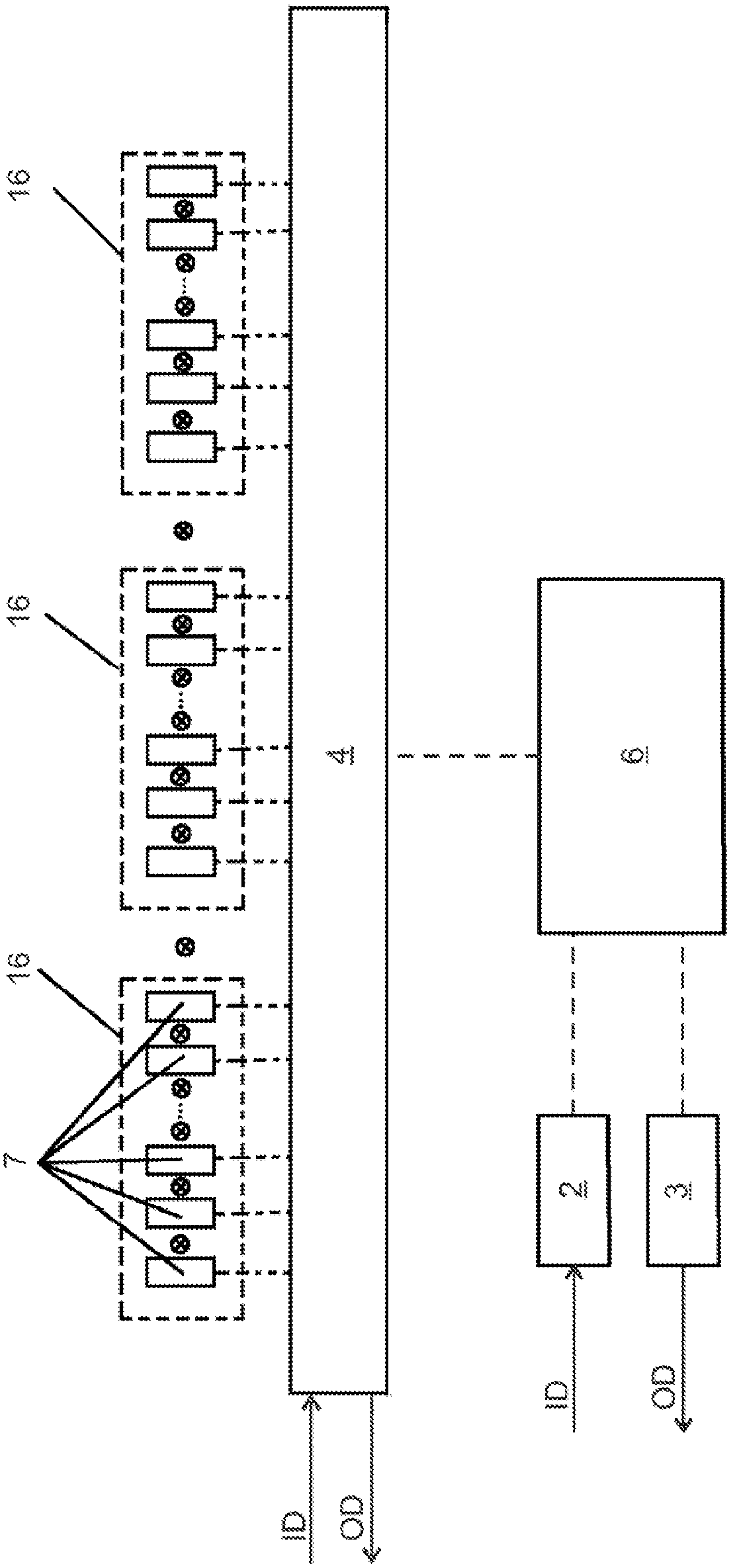
FIG. 2: the internal structure of the computing device and interactions between its components and other components of the data processing device

FIG. 2 shows a plurality of computation modules 7 which in some embodiments are organized into logical computational groups 16 (which could be organized into logical meta-groups, but this is not shown) and which interact with at least one data hub process 6 via a shared memory device 4. Input data ID is inputted via at least one first interface 2 into the shared memory device 4 and/or the at least one data hub process 4. Output data OD is outputted via at least one first interface 2 into the shared memory device 4 and/or the at least one data hub process 6.

Figure 3:
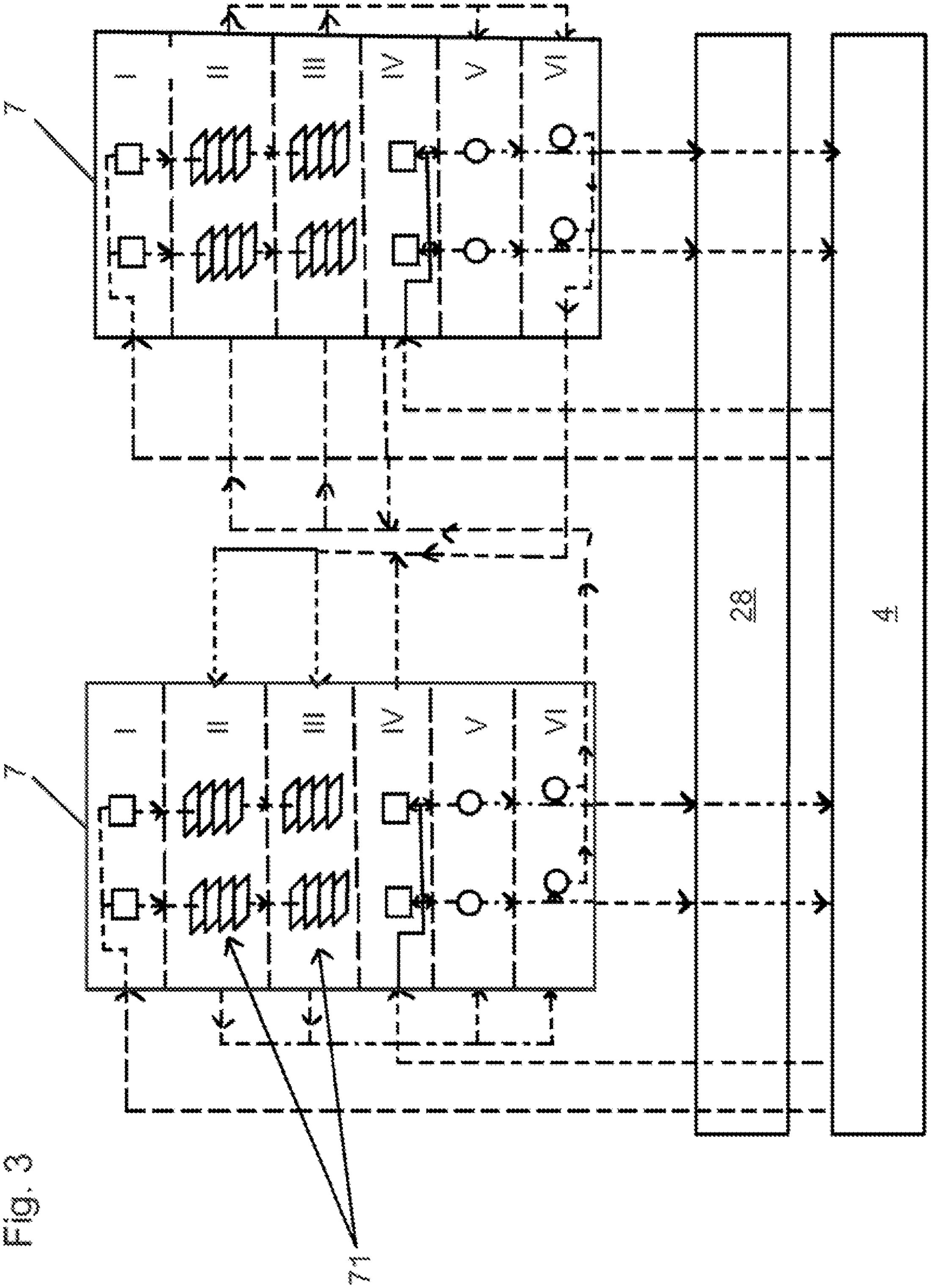
FIG. 3: the internal structure of computation modules and interactions between their components and other components of the data processing device
Figure 17:
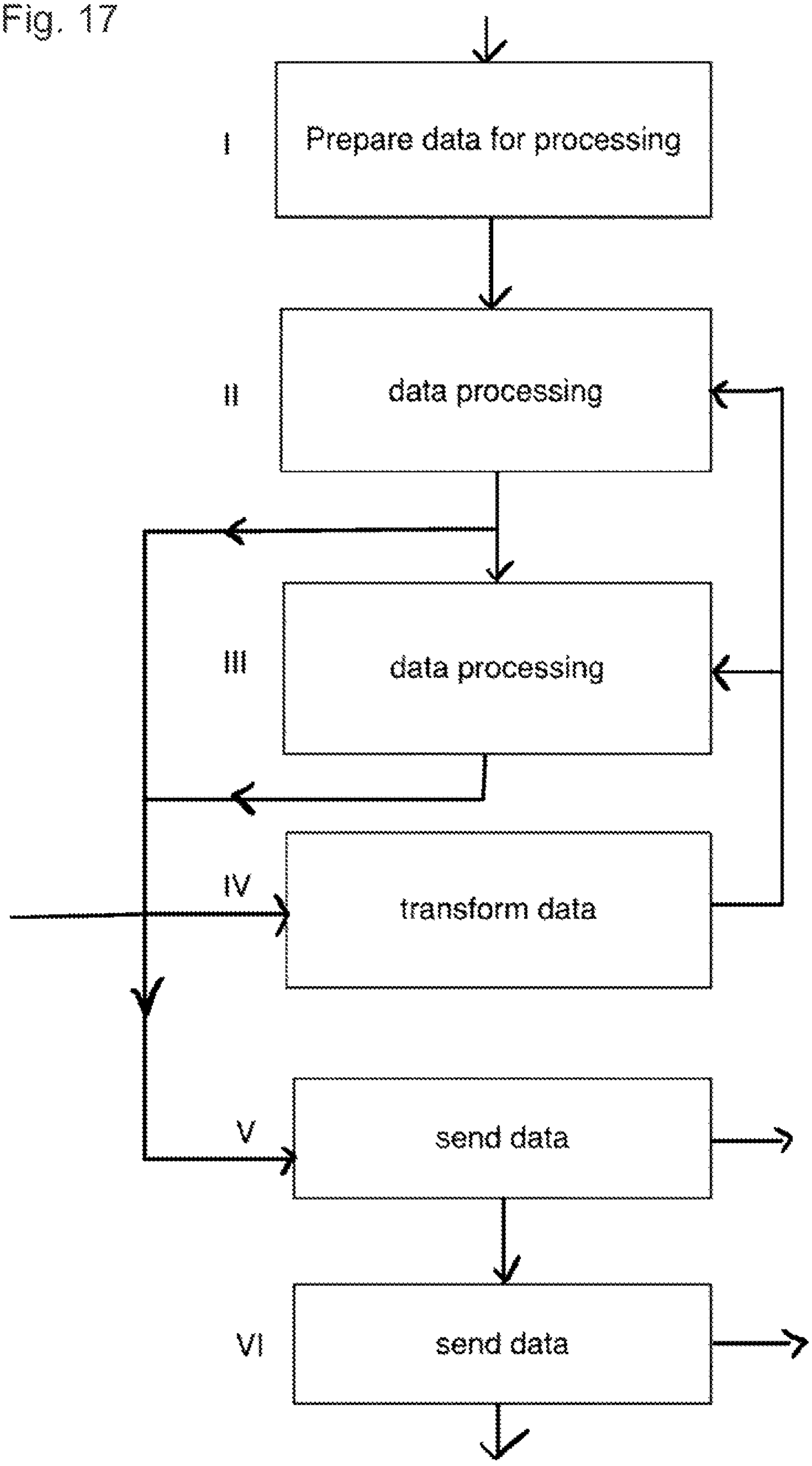
FIG. 17: a possible vertical hierarchical organization of a computation module

FIG. 3 shows the internal structure of computation modules 7 for an embodiment in which the computation modules 7 are provided with, e.g., six different layers I, II, III, IV, V, VI (the number of layers could be different for different computation modules 7). Steps of analysing data using such a structure are also shown in FIG. 17. It can also be seen that a routing process 28 is present (in this embodiment separate from the data hub process 6 although in some embodiments it can form part of it) which knows which computation module 7 has to be connected with which other component of the data processing device 1.

In some embodiments layer I might be configured to process module-specific keyed data segments $KS_i$ obtained from shared memory 4 or the data hub process 6 such as a target vector. This layer can prepare data to be better suited for processing by the at least one neuronal network 71, e.g., by topological down transformation, as is known in the art.

In some embodiments layer II and/or III might be configured to process data obtained from layer I and, possibly, from other computational modules 7, e.g., via neuronal networks 71 (by way of example ANNs are shown). These are the layers where machine learning takes place to cognitively process data during data analysis. In some embodiments, these layers can also receive information from other computation modules 7, e.g., from layers V or VI of these other computation modules 7.

In some embodiments layer IV might be configured to comprise at least one neuronal network 71 which, however, is not used for cognitive data processing but to transform data from the data hub process 6 or the shared memory 4 (such as an input vector) for layers II and III, e.g., by topological down transformation.

In some embodiments layer V and/or VI might be configured to comprise neuronal networks 71 which can be used to learn whether information represented by data is better suited to be processed in a different computation module 7 and can send this data accordingly to the data hub process 6 (preferably via the routing process 28) and/or the shared memory device 4 and/or at least one other computation module 7 where this data can be inputted, e.g., in layers II or III.

Figure 4:
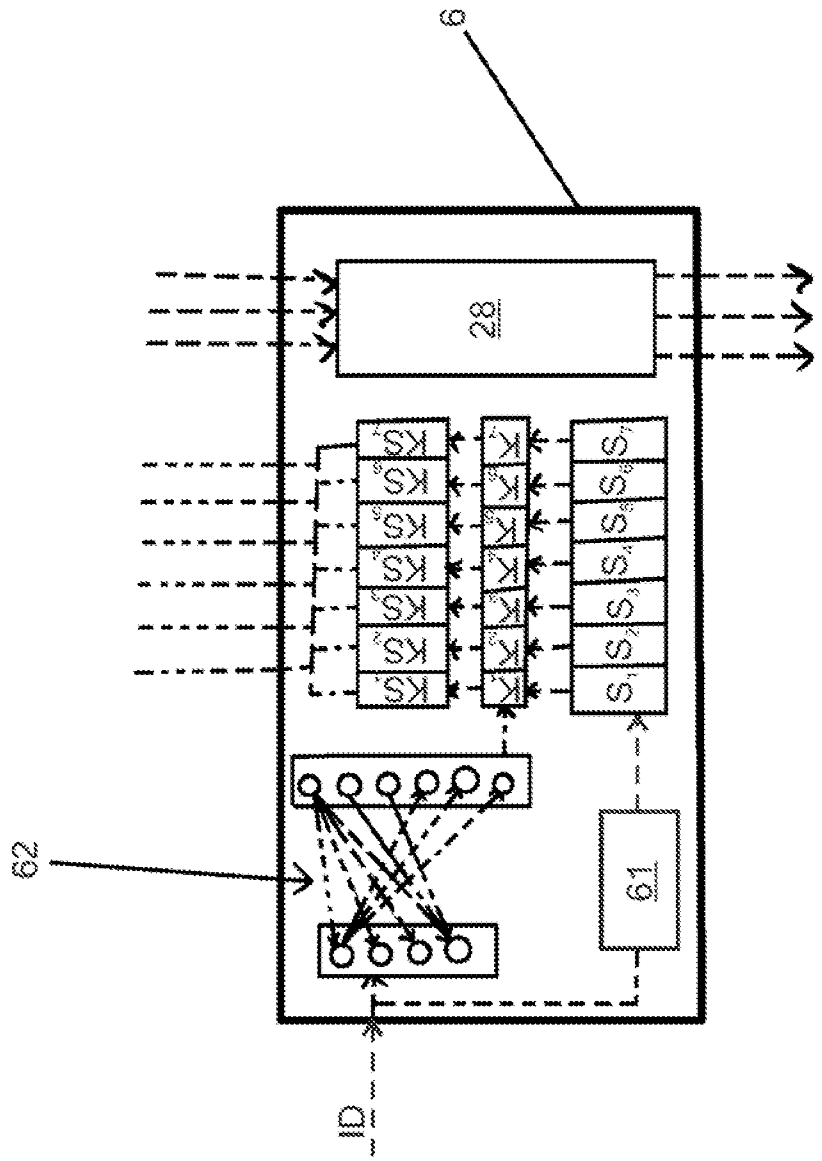
FIG. 4: the internal structure of a data hub process.

FIG. 4 shows the internal structure of one of possibly several data hub processes 6 for an embodiment in which:

- input data ID is segmented into data segments $S_1, \ldots, S_7$ by one of possibly several segmentation sub-processes 61
- keys $K_1, \ldots, K_7$ are determined by one of possibly several keying sub-processes 62 (in some embodiments at least one ART network might be used for that purpose)
- the keys $K_1, \ldots, K_7$ are assigned to the data segments $S_1, \ldots, S_7$ to create keyed data segments $KS_1, \ldots, KS_7$ by one of possibly several keying sub-processes 62
- the keyed data segments $KS_1, \ldots, KS_7$ are written into the shared memory device 4
- an optional at least one routing process 28, here as a sub-process, which directs output provided by at least one of the computation modules 7 to at least one other computation module 7, the at least one routing process 28 accessing the shared memory device 4

Figure 5:
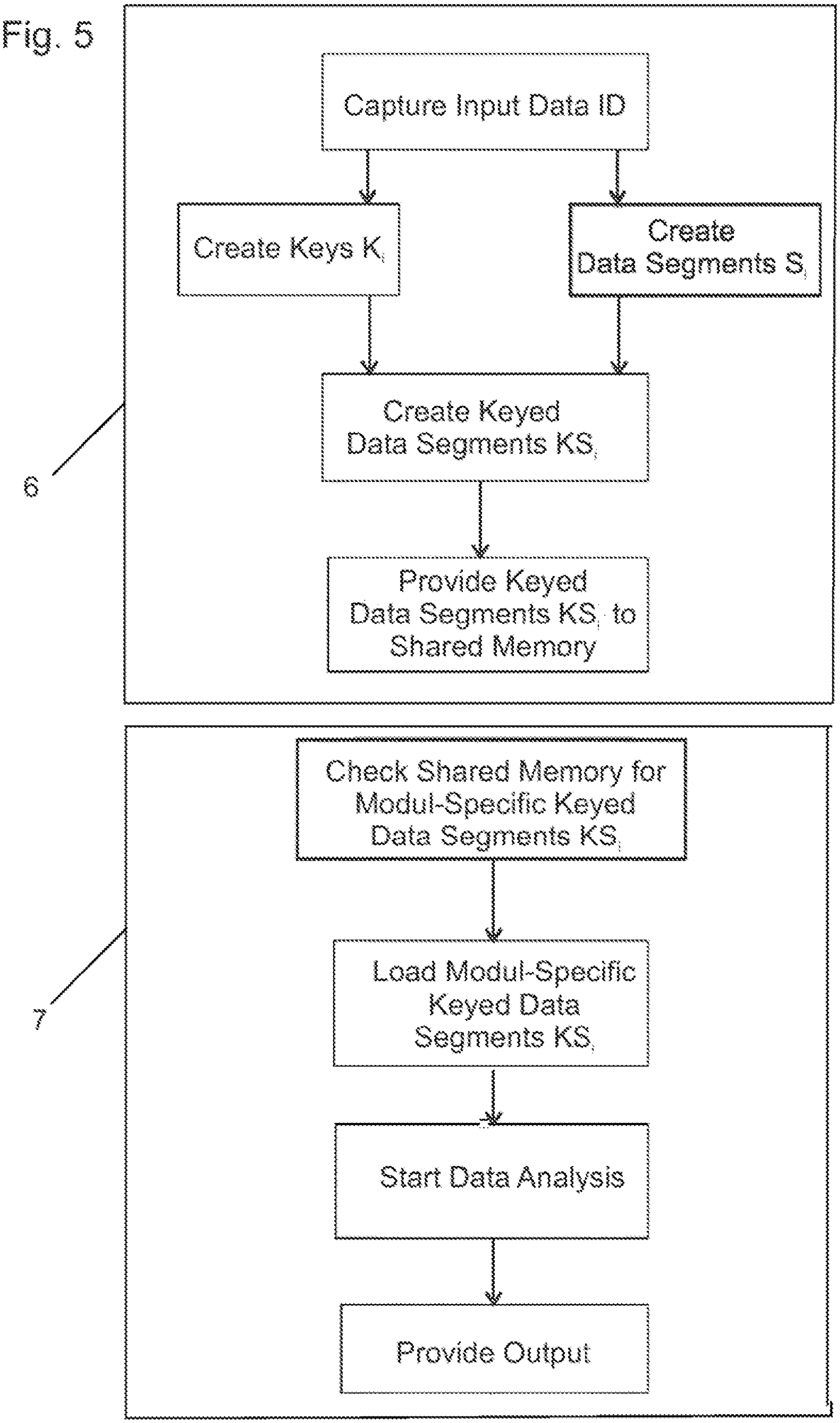
FIG. 5: steps according to an embodiment of the invention
Figure 6:
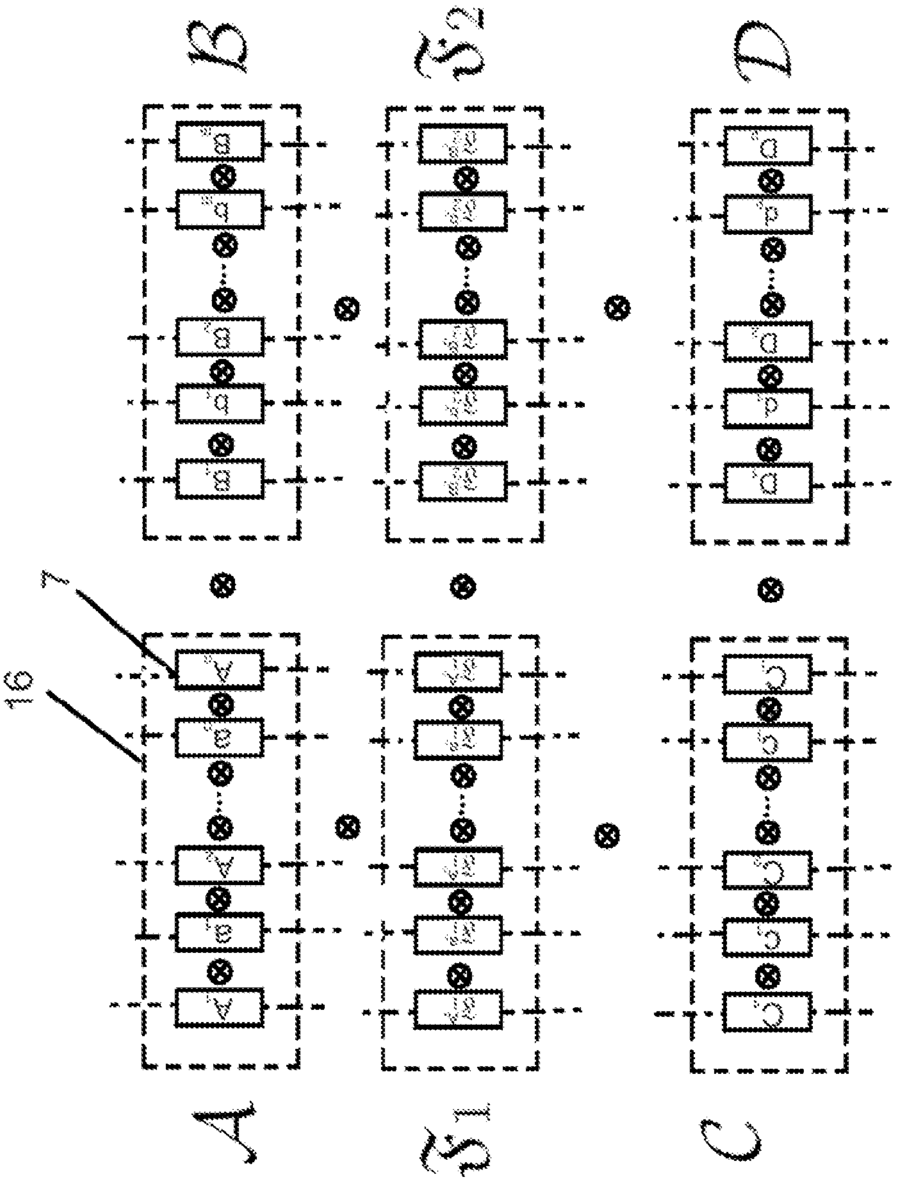
FIG. 6: computation modules representing categorical constructions

FIG. 5 shows possible steps carried out by at least one data hub process 6 and at least one computation module 7:

- input data ID is captured via the at least one first interface 2
- keys $K_i$ are determined by one of possibly several keying sub-processes 62
- input data ID is segmented into data segments $S_i$ by one of possibly several segmentation sub-processes 61
- keyed data segments $KS_i$ are created by one of possibly several keying sub-processes 62
- the keyed data segments $KS_i$ are provided to shared memory device 4
- the computation modules 7 repeatedly check shared memory device 4 for module-specific keyed data segments $KS_i$
- the computation modules 7 load their module-specific keyed data segments $KS_i$ if any are present, otherwise they stay idle
- the computation modules 7 start data analysis on the module-specific keyed data segments $KS_i$
- the computation modules 7 provide their output to shared memory device 4 and/or at least one data hub process 6 and/or at least one other computation module 7

FIG. 5 shows how categorical constructs can be represented by the computation modules 7 and their interactions in some embodiments. It should be noted that the number of computation modules 7 per computational group 16 can be different between computational groups 16 and that the representation of categorical constructions by computation modules 7 in no way relies on the presence of computational groups 16 or the internal structure of computation modules 7.

In some embodiments different computational groups 16 may represent different categories $\mathcal{A}, \mathcal{B}, \mathcal{C}, \mathcal{D}$ wherein each computation module 7 represents an object $A_i$, $B_i$, $C_i$, $D_i$ or a morphism $a_i$, $b_i$, $c_i$, $d_i$ and other computational groups 16 may represent functors $\mathfrak{F}_1$, $\mathfrak{F}_2$ between different categories, e.g., $\mathfrak{F}_1: \mathcal{A} \rightarrow \mathcal{C}$ and $\mathfrak{F}_2: \mathcal{B} \rightarrow \mathcal{D}$ such that $\mathfrak{F}_1^{A_i}(A_i)=C_i$, $\mathfrak{F}_2^{B_i}(B_i)=D_i$ for the objects of the categories and $\mathfrak{F}$ $\mathfrak{F}$ for the morphisms of the categories.

Different examples of more complex categorical constructs such as the projective limit $$\overset{\lim}{\leftarrow} A_i$$

or natural transformations and their possible uses have already been discussed above and further examples will be discussed with respect to the following Figures.

It is an advantage of those embodiments of the present invention comprising categorical constructions that concepts which have been learned by computation modules 7 in a supervised way can be used by the data processing device 1 to learn related concepts in an, at least partially, unsupervised way.

Figure 7:
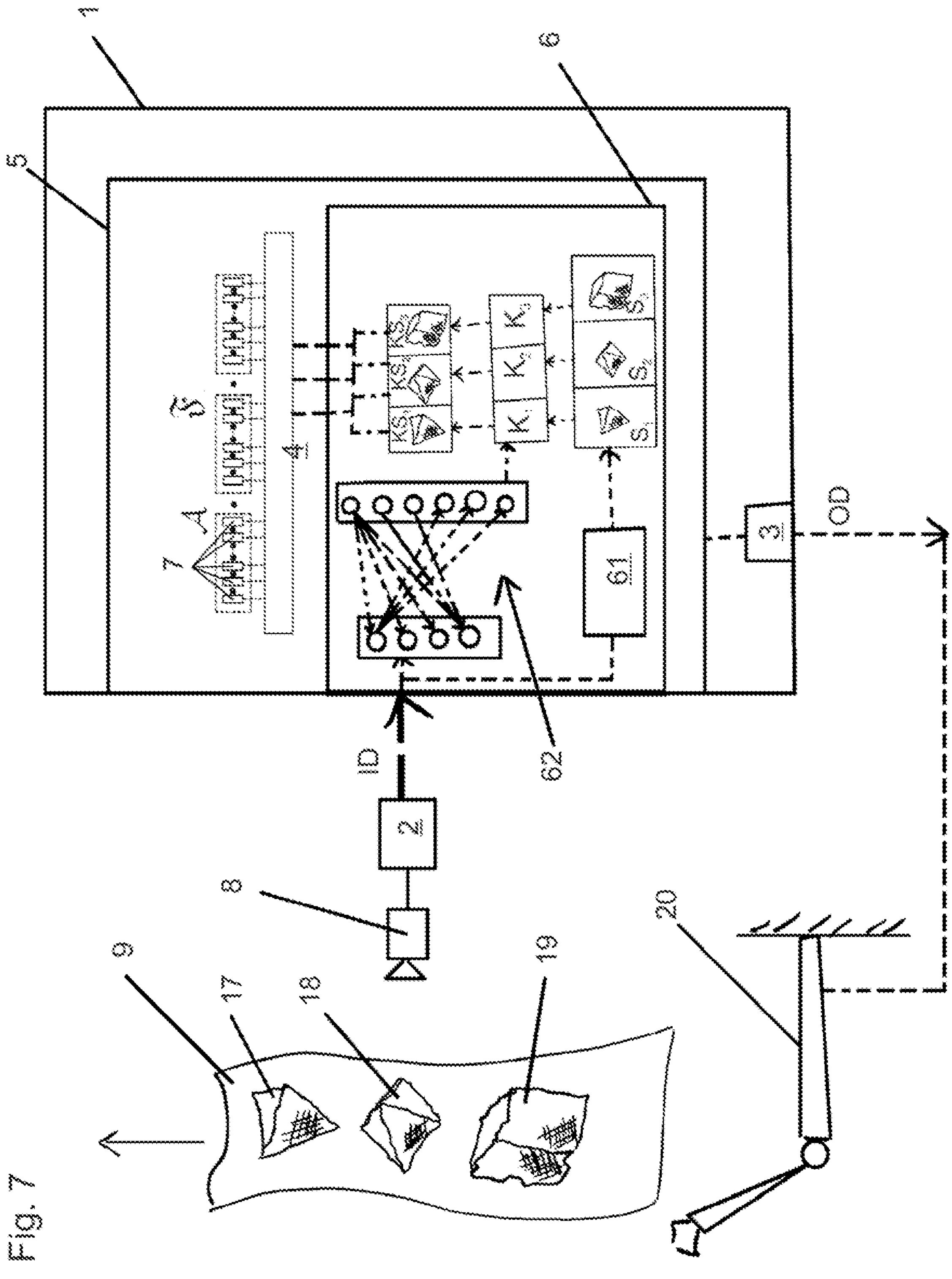
FIG. 7: an example involving structure recognition

FIG. 7 shows an example where a number of computation modules 7 is configured to do structure recognition in order to enable them to recognize geometrical objects in the shape of tetrahedrons, octahedrons or boxes, irrespective of a color, rotational state or possible deformations of the geometrical objects. It could be arranged that the data procession device 1 causes a robot 20 to remove some geometrical objects from the conveyor belt 9 but not others by providing output data OD via the second interface 3 in the form of robot commands to the robot 20.

Different objects (tetrahedron 17, octahedron 18 and box 19) are placed on a conveyor belt 9 which transports them past an image capturing device 8 (here in the form of an optical camera) which is connected to the first interface 2 to provide video stream or a series of images as input data ID which can be loaded by the data hub process 6. The input data ID is segmented and keys are created as described above. In the present example it is supposed that the segmentation sub-process 61 has been trained according to the art to recognize the presence of individual objects in the input data ID and to create data segments $S_1$, $S_2$, $S_3$ (without recognizing the type of object) and the keying sub-process 62 has been trained according to the art to create keys $K_1$, $K_2$, $K_3$ for the different objects such that the data hub process 6 can create keyed data segments $KS_1$, $KS_2$, $KS_3$ and provide them to the shared memory device 4.

Figure 8:
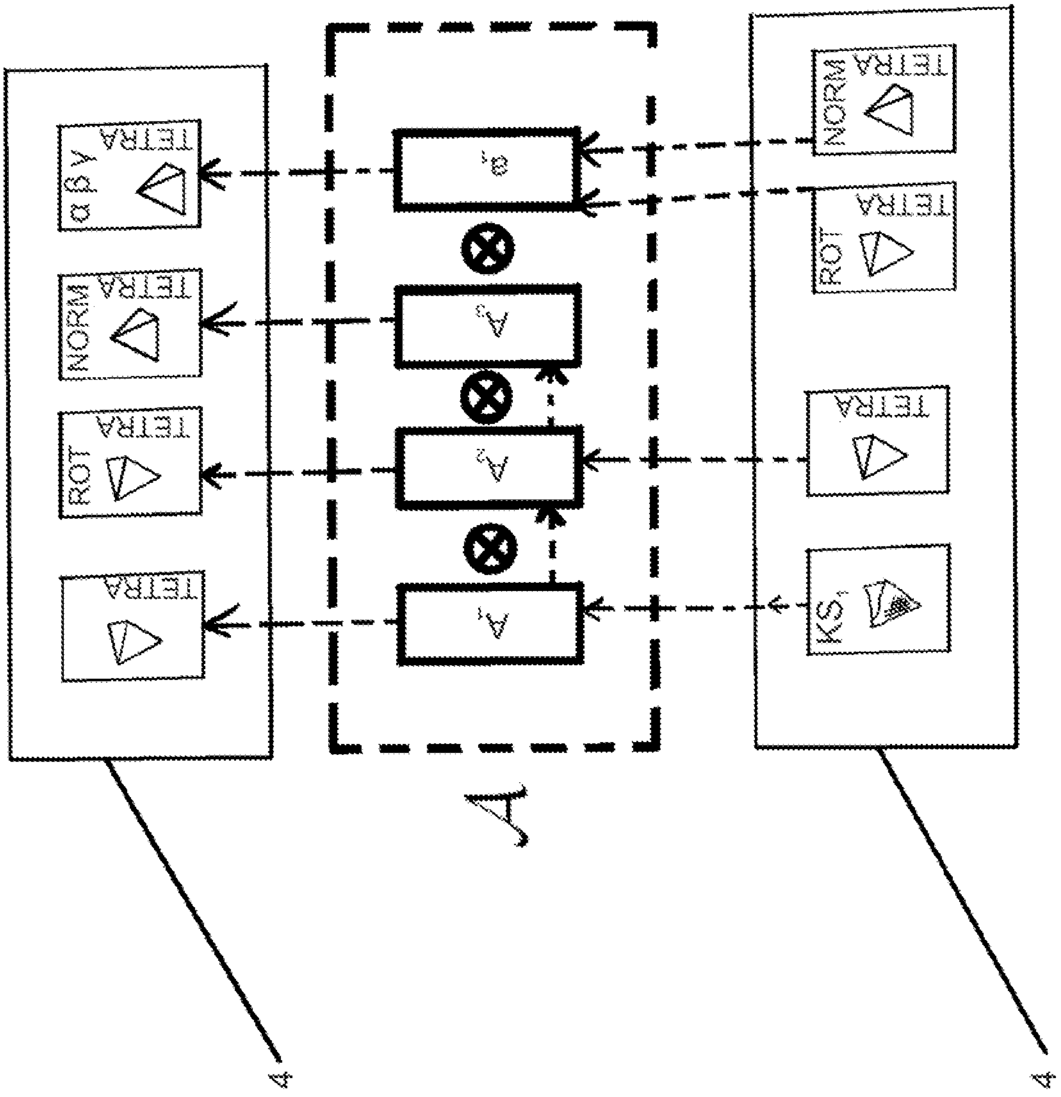
FIG. 8: a detail regarding the example of FIG. 7

Turning to FIG. 8 a number of computation modules 7 representing a category $\mathcal{A}$ is shown. The number of computation modules 7 is understood to be symbolic, in reality it will often be larger than the four computation modules 7 shown. A first computation module 7 represents an object $A_1$ and is trained to repeatedly access the shared memory device 4 looking for keyed data segments $KS_1$ representing objects. Although the computation modules 7 of this group are specifically trained to analyse tetrahedrons 17 it will load all keyed data segments $KS_1$, $KS_2$, $KS_3$ which are keyed as representing objects. In case during analysis it finds that a loaded keyed data segment $KS_2$, $KS_3$ does not represent a tetrahedron 17 it can return this keyed data segment $KS_2$, $KS_3$ to the shared memory device 4 with the additional information "not a tetrahedron 17" so that it will not be loaded by a computation module 7 of this group again. Once a keyed data segment $KS_1$ has been loaded by the computation module 7 representing object $A_1$ analysis begins. This computation module 7 has been trained to recognize tetrahedrons 17 irrespective of the color of the object (symbolized by shading), orientation of the object or possible deformation. As an output it creates data representing $A_1$="tetrahedron" as symbolized by the box showing a tetrahedron 17 without shading and provided with the additional information "TETRA". This output can either be sent directly to other computation modules 7 of this group or can be stored in the shared memory device 4. Here it is assumed that it is stored in the shared memory device 4 and the computation module 7 representing object $A_2$ loads this information. Computation module 7 representing object $A_2$ has been trained to recognize that the tetrahedron 17 is in a rotational state (with respect to a normalized state represented by object $A_3$) and outputs this information as $A_2$="TETRA, ROT, $\alpha$, $\beta$, $\gamma$". However, it should be noted, that this computation module 7 does not necessarily encode the rotation group SO(3) since it is not necessary for the computation module 7 to know the exact values of $\alpha$, $\beta$, $\gamma$. Computation module 7 has been trained to receive as input $A_2$ and $A_3$, recognize the rotational state of tetrahedron 17 by comparing these two inputs and to output this information which can be understood as representing the morphism $a_1{:}A_3 \rightarrow A_2$ as "TETRA, ROT, $\alpha$, $\beta$, $\gamma$".

Of course other types of transformations than rotations could be represented, such as translations, reflections, . . . . It is to be understood that in some embodiments the morphism $a_1$ might be composed of several morphisms $a_1 = a_{11} \circ \ldots \circ a_{1k}$ wherein each morphism is encoded by one or several computation modules 7, e.g., of three morphisms $a_{11}$, $a_{12}$, $a_{13}$ wherein each morphism encodes rotation about a single axis or translation along a single direction.

Figure 9:
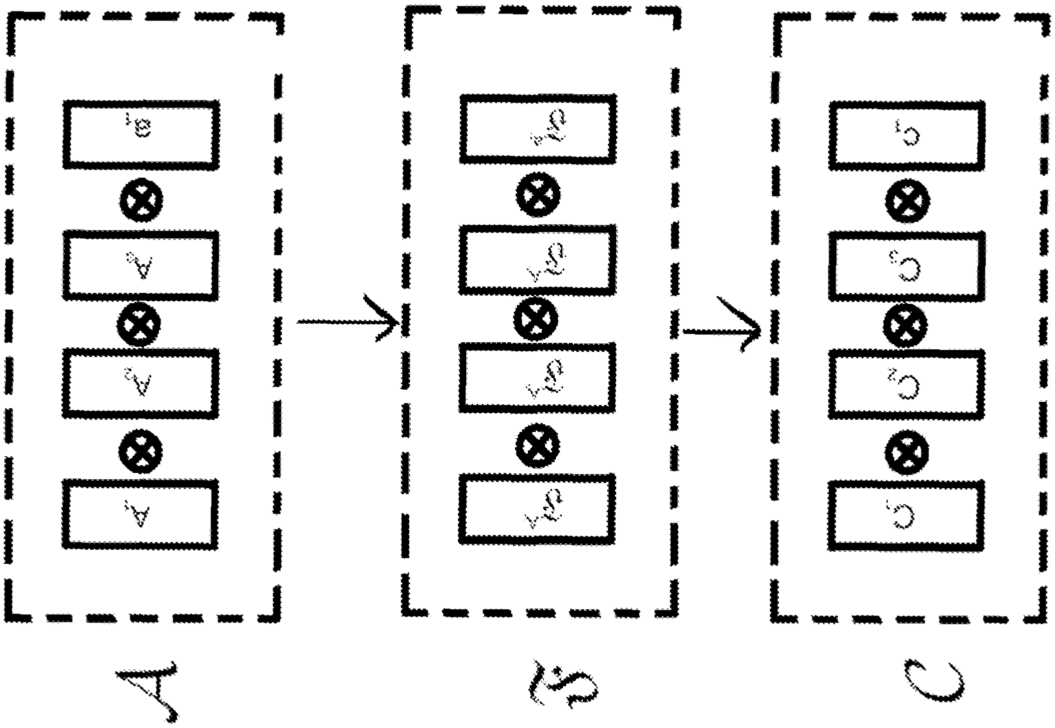
FIG. 9: a detail regarding the example of FIG. 7

The group of computation modules 7 of FIG. 9 is the same as the one shown in FIG. 8. Using the categorical construct of a functor $\mathfrak{F}$ the objects and morphisms of category $\mathcal{A}$ can be mapped to objects and morphisms of category $\mathcal{C}$ which, in this example, represents octahedrons 18. In this way it is not necessary to train the computation modules 7 of category $\mathcal{C}$ once training of the computation modules 7 of category $\mathcal{A}$ is completed because all necessary concepts are mapped by the functor $\mathfrak{F}$ from category $\mathcal{A}$ to category $\mathcal{C}$ resulting in FIG. 10 (of course, the same can be done by a different functor with respect to a category representing boxes). In this example the functor $\mathfrak{F}$ has been learned by comparing the rotational states of different geometrical objects, namely tetrahedrons 17 and boxes 19 after these rotational states had been learned.

Figure 10:
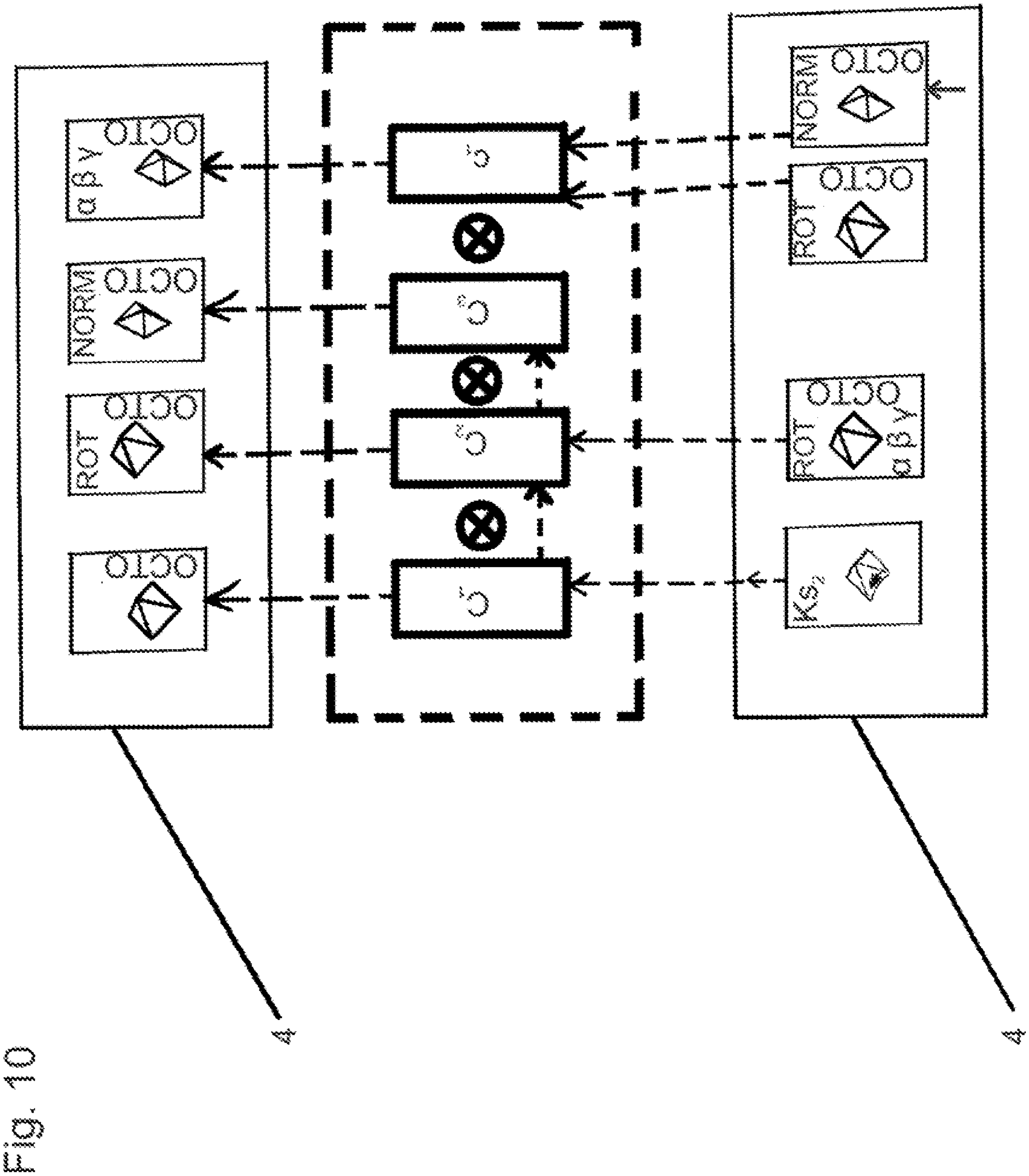
FIG. 10: a detail regarding the example of FIG. 7

FIG. 10 shows a number of computation modules 7 representing a category C. The number of computation modules 7 is understood to be symbolic, in reality it will often be larger than the four computation modules 7 shown. A first computation module 7 represents an object $C_1$ and is trained to repeatedly access the shared memory device 4 looking for keyed data segments $KS_1$ representing objects. Although the computation modules 7 of this group are specifically trained to analyse octahedrons 18 it will load all keyed data segments $KS_1$, $KS_2$, $KS_3$ which are keyed as representing objects. In case during analysis it finds that a loaded keyed data segment $KS_1$, $KS_3$ does not represent an octahedron 18 it can return this keyed data segment $KS_1$, $KS_3$ to the shared memory device 4 with the additional information "not an octahedron 18" so that it will not be loaded by a computation module 7 of this group again. Once a keyed data segment $KS_2$ has been loaded by the computation module 7 representing object $C_1$ analysis begins. This computation module 7 has been trained to recognize octahedrons 18 irrespective of the color of the object (symbolized by shading), orientation of the object or possible deformation. As an output it creates data representing $C_1$="octahedron" as symbolized by the box showing an octahedron 18 without shading and provided with the additional information "OCTO". This output can either be sent directly to other computation modules 7 of this group or can be stored in the shared memory device 4. Here it is assumed that it is stored in the shared memory device 4 and the computation module 7 representing object $C_2$ loads this information. Computation module 7 representing object $C_2$ has been trained to recognize that the octahedrons 18 is in a rotational state (with respect to a normalized state represented by object $A_3$) and outputs this information as $C_2$="OCTO, ROT, $\alpha$, $\beta$, $\gamma$". Computation module 7 has been trained to receive as input $C_2$ and $C_3$, recognize the rotational state of octahedron 18 by comparing these two inputs and to output this information which can be understood as representing the morphism $c_1{:}C_3 \rightarrow C_2$ as "OCTO, ROT, $\alpha$, $\beta$, $\gamma$".

Figure 11:
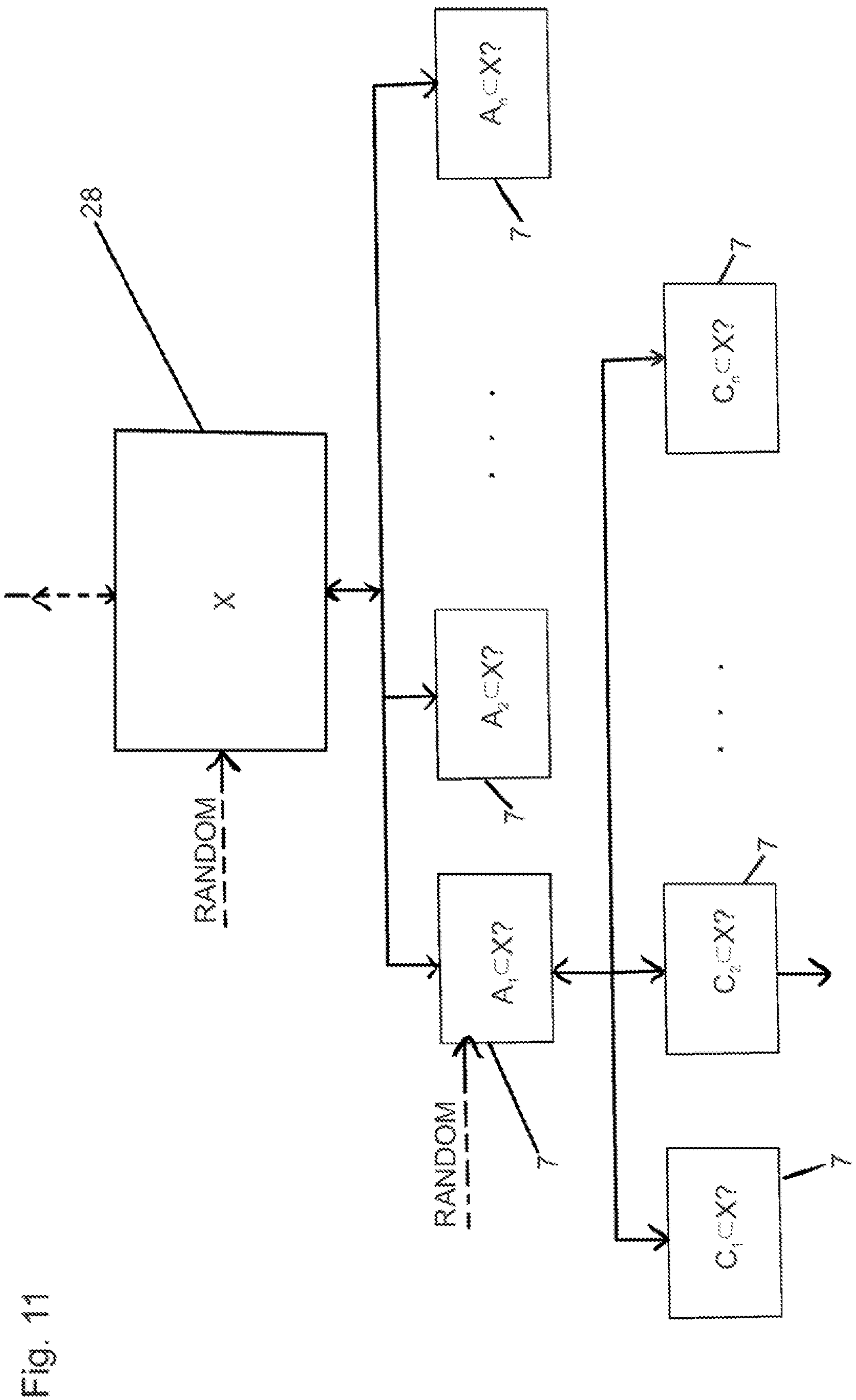
FIG. 11: an example involving data processing

FIG. 11 shows how, in some embodiments, the data processing device 1 can analyse complex data by making use of different computation modules 7 which are each trained to recognize specific data. Some data X is inputted to the routing process 28 (or a different structure such as a sufficiently complex arrangement of computation modules 7) which sends this data to different computation modules 7. Each computation module 7 checks whether it knows (at least part of) the data X by checking, whether $A_i$ forms part of data X (here represented by the mathematical symbol for "being a subset of"). If the answer is "yes" it reports this answer back to sub-process 63. If the answer is "no" it can report this answer back to sub-process 63 or, in a preferred embodiment at least with respect to some computational modules 7, sends the data (segment) to at least one other computation module 7 (which can, e.g., form part of a category that might be better suited to recognize this data). By way of example, data X might represent some geometrical object such as an octahedron or (part of) a sentence such as "The cat gives birth to a baby".

In the first example, the computation modules 7 of a first category $\mathcal{A}$ might represent objects $A_i$ that represent geometrical objects in the form of differently deformed or rotated tetrahedrons, while the computation modules 7 of second category $\mathcal{C}$ might represent objects $C_i$ in the form of differently deformed or rotated octahedrons. The computation modules 7 of the first category $\mathcal{A}$ will not be able to recognize data X in the form of an octahedron (since they know tetrahedrons) and will either give this information to the routing process 28 or, as shown in this Figure, can send this data X to computation modules 7 of the second category $\mathcal{C}$ which will be able to recognize the data X.

In the second example, the computation modules 7 of a first category $\mathcal{A}$ might represent objects $A_i$ that represent nouns (e.g., "cat", "birth") or verbs (e.g., "give") referring to a first topic (e.g., "cats"), while the computation modules 7 of second category $\mathcal{C}$ might represent objects $C_i$ that represent nouns (e.g., "dog", "birth") or verbs (e.g., "give") referring to a second topic (e.g., "dogs"). The computation modules 7 of the first category $\mathcal{A}$ will be able to recognize data X in the form of a sentence concerning "cats" and will give this information to the routing process 28 or, could send this data X to computation modules 7 of a different category for further processing.

In preferred embodiments, the data processing device 1 is enabled to create new concepts itself (cf. FIG. 13) by inputting a random signal RANDOM to at least one layer of the neuronal network(s) 71 of a computation module 7 such that the inputs of the neurons which, after integration, are used by an activation function $\sigma$ of the known kind of the neuronal network 71 to determine whether a certain neuron 21 will fire or not, are modified. In this way, a neuronal network 71 which is inputted with information regarding a geometrical object will base its computation not on the inputted information alone but on the inputted information which was altered by the random signal. In FIG. 11 this is shown by the signal line denoted "RANDOM". In some embodiments, if a hierarchically structured computation module 7 is used, this random signal RANDOM could be provided to the at least one neuronal network 71 present in layer III.

Figure 12:
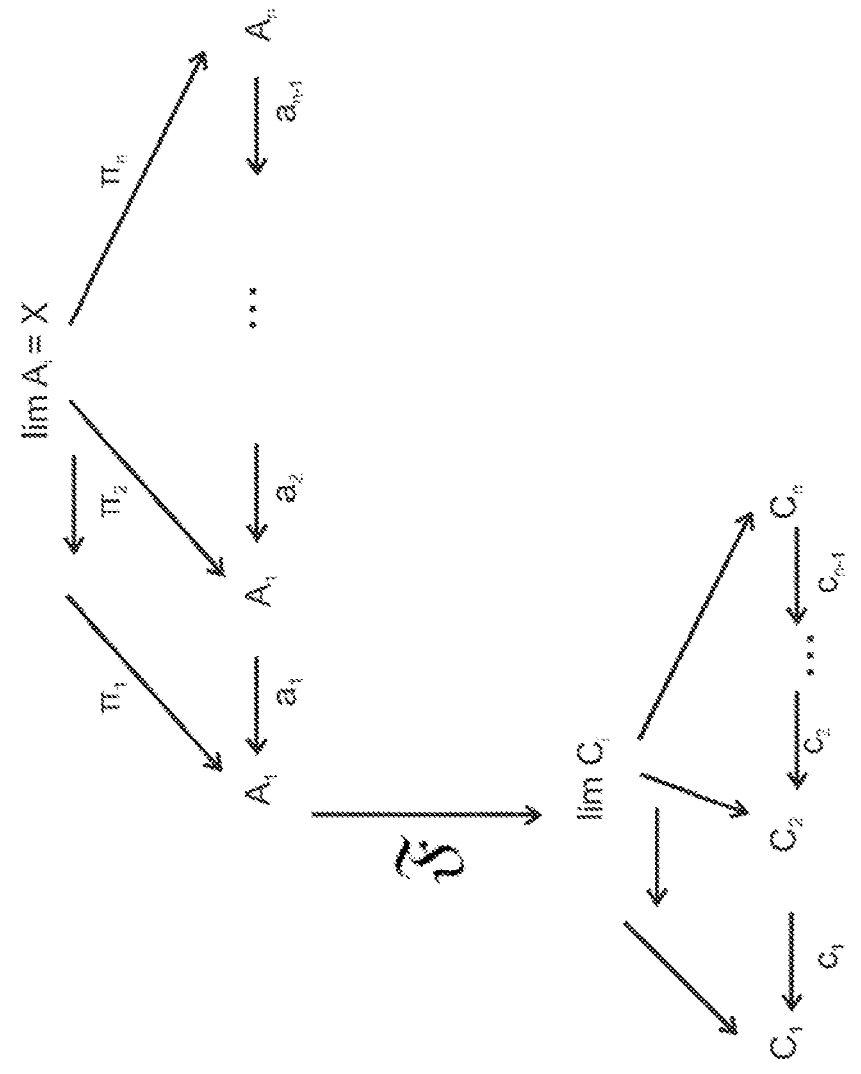
FIG. 12: the example of FIG. 11 using categorical constructions

FIG. 12 shows how the projective limit can be used for the process described in FIG. 11, e.g., by the routing process 28 of the data hub process 6 and/or by individual computation modules 7 and/or groups 16 of computation modules 7: data X which is to be interpreted is inputted to a computation module 7 (depending on the complexity of the data it will, in practice, often have to be a group 16 of computation modules 7) which is interpreted to represent the projective limit of the data X which is interpreted to consist of a sequence of data segments $$A_1 \xleftarrow{a_1} A_2 \xleftarrow{a_2} \dots \xleftarrow{a_{n=k-1}} A_{n=k}.$$

The projective limit is the object $$\overset{\lim}{\leftarrow} A_i$$

together with morphisms $\pi_i$ which means that the sequence $A_{n=i}, \dots, A_{n=k}$ is projected onto its ith member $A_{n=i}$. The data processing device 1 can remember how the data X was segmented, e.g., by use of the projection morphisms $\pi_i$ and morphisms $\alpha_i$. Although not shown in FIG. 12, input of random signals RANDOM could also be present.

Figure 13:
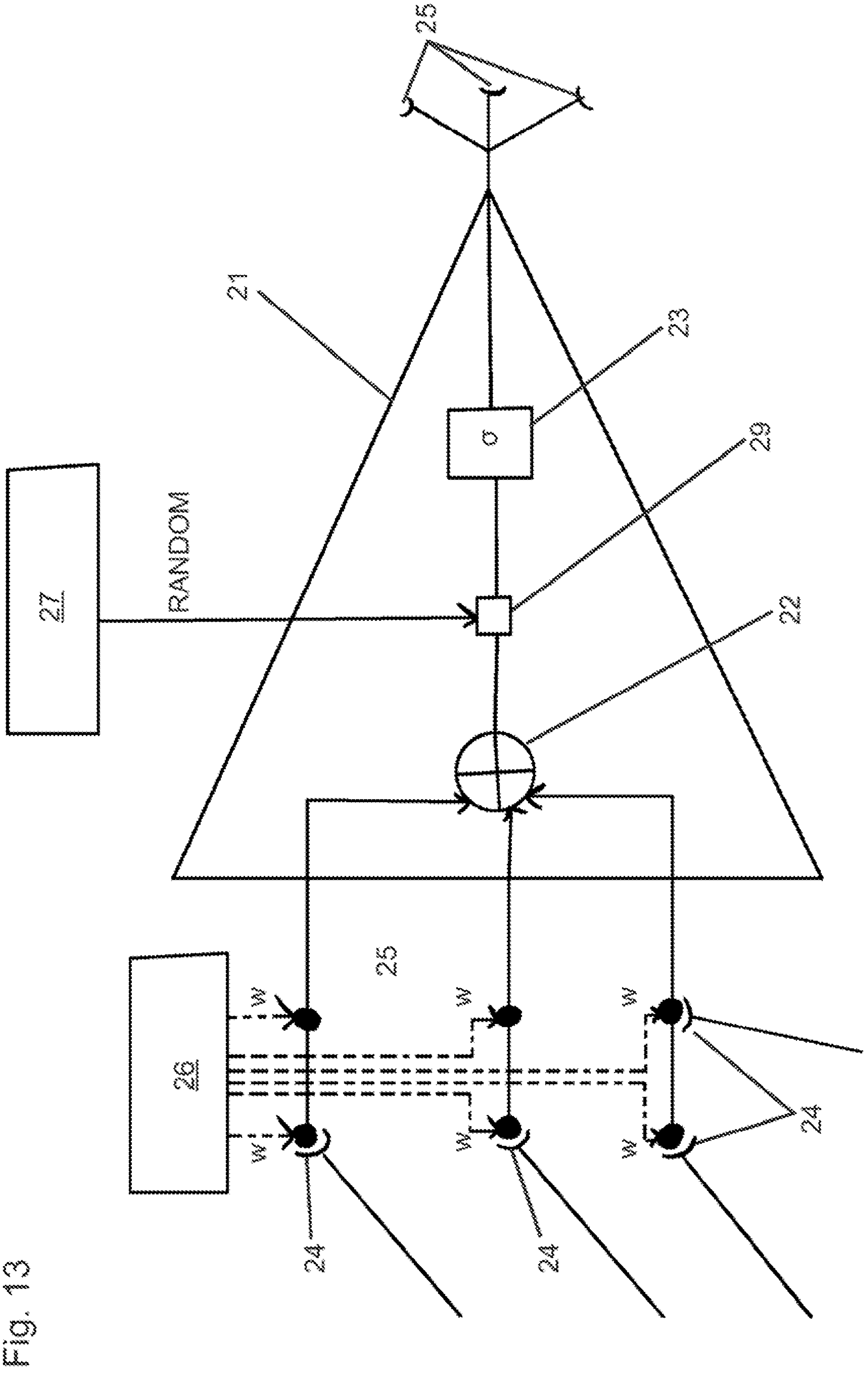
FIG. 13: an example showing a single artificial neuron having a receptor for a random signal

FIG. 13 shows a single artificial neuron 21 of an artificial neuronal network 71. The artificial neuron 21 (in the following in short: "neuron 21") has at least one (usually a plurality of) synapse 24 for obtaining a signal and at least one axon for sending a signal (in some embodiments a single axon can have a plurality of branchings 25). Usually, each neuron 21 obtains a plurality of signals from other neurons 21 or an input interface of the neuronal network 71 via a plurality of synapses 24 and sends a single signal to a plurality of other neurons 21 or an output interface of the neuronal network 71. A neuron body is arranged between the synapse(s) 24 and the axon and comprises at least an integration function 22 for integrating the obtained signals according to the art and an activation function 23 to decide whether a signal is sent by this neuron 21. Any activation function 23 of the art can be used such as a step-function, a sigmoid function, . . . . As known in the art, the signals obtained via the synapses 24 can be weighted by weight factors w. These can be provided by a weight storage 26 which might form part of a single computation module 7 or could be configured separately from the computation modules 7 and could provide individual weights w to a plurality (or possibly all) of the neuronal networks 71 of the computation modules 7. These weights w can be obtained as known in the art, e.g., during a training phase by modifying a pre-given set of weights w such that a desired result is given by the neuronal network 71 with a desired accuracy.

In some embodiments the neuron body can comprise a receptor 29 for obtaining a random signal RANDOM which is generated outside of the neuronal network 71 (and, preferably, outside of the computation module 7). This random signal RANDOM can be used in connection with the autonomous creation of new concepts by the data processing device 1.

The neurons 21 of a neuronal network 71 can be arranged in layers $L_1$, $L_2$, $L_3$ (which are not to be confused with the layers I-VI of a computation module 7 if the computation module 7 has a hierarchical architecture).

In some embodiments, the layers $L_1$, $L_2$, $L_3$ will not be fully connected.

Figure 14:
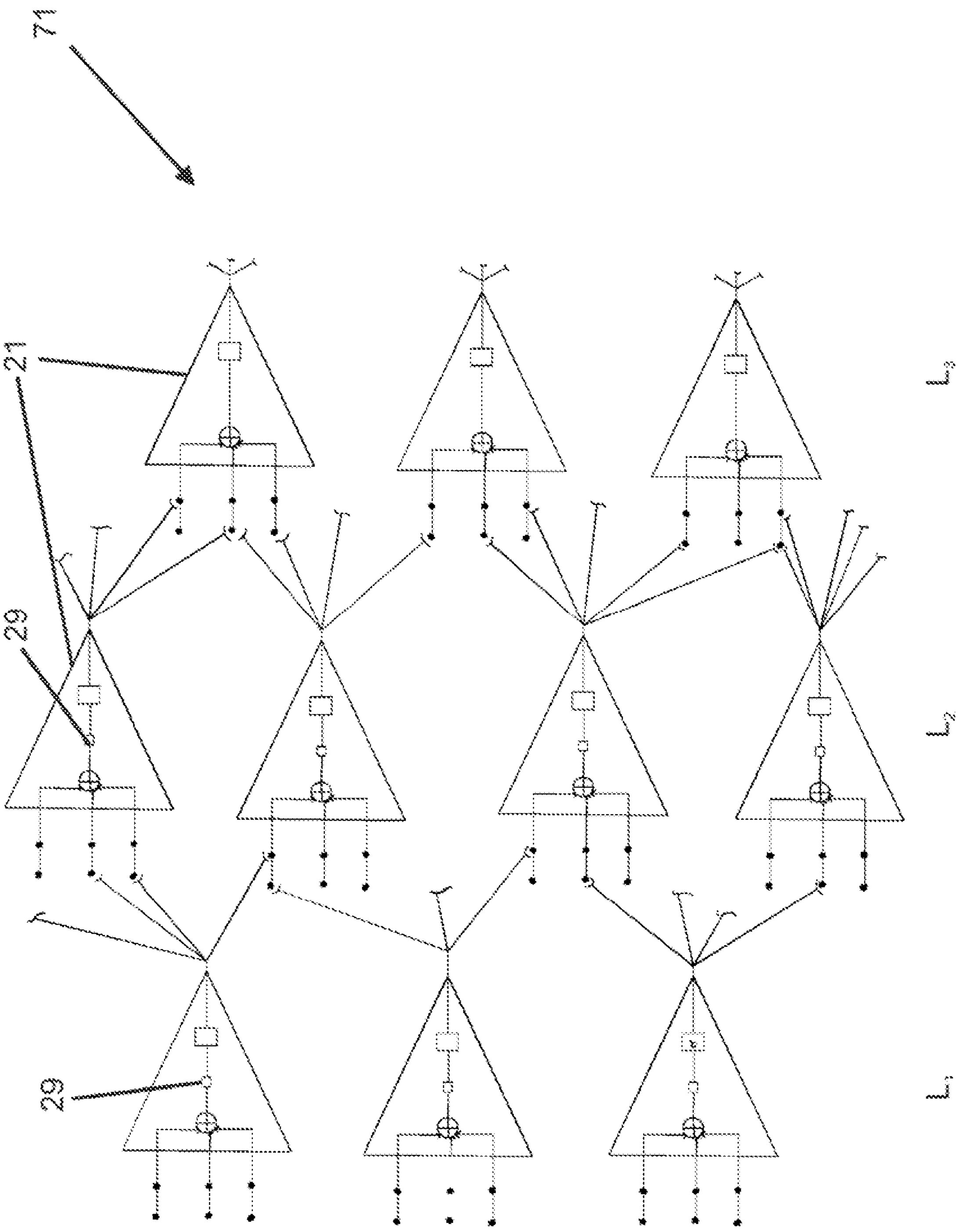
FIG. 14: an example of a neuronal network having a plurality of neurons as shown in FIG. 13

FIG. 14 shows three layers $L_1$, $L_2$, $L_3$ of neurons 21 which form part of a neuronal network 71. Not all of the connections between the neurons 21 are shown. Some of the neurons 21 are provided with a receptor 29 for obtaining a random signal RANDOM.

Figure 15:
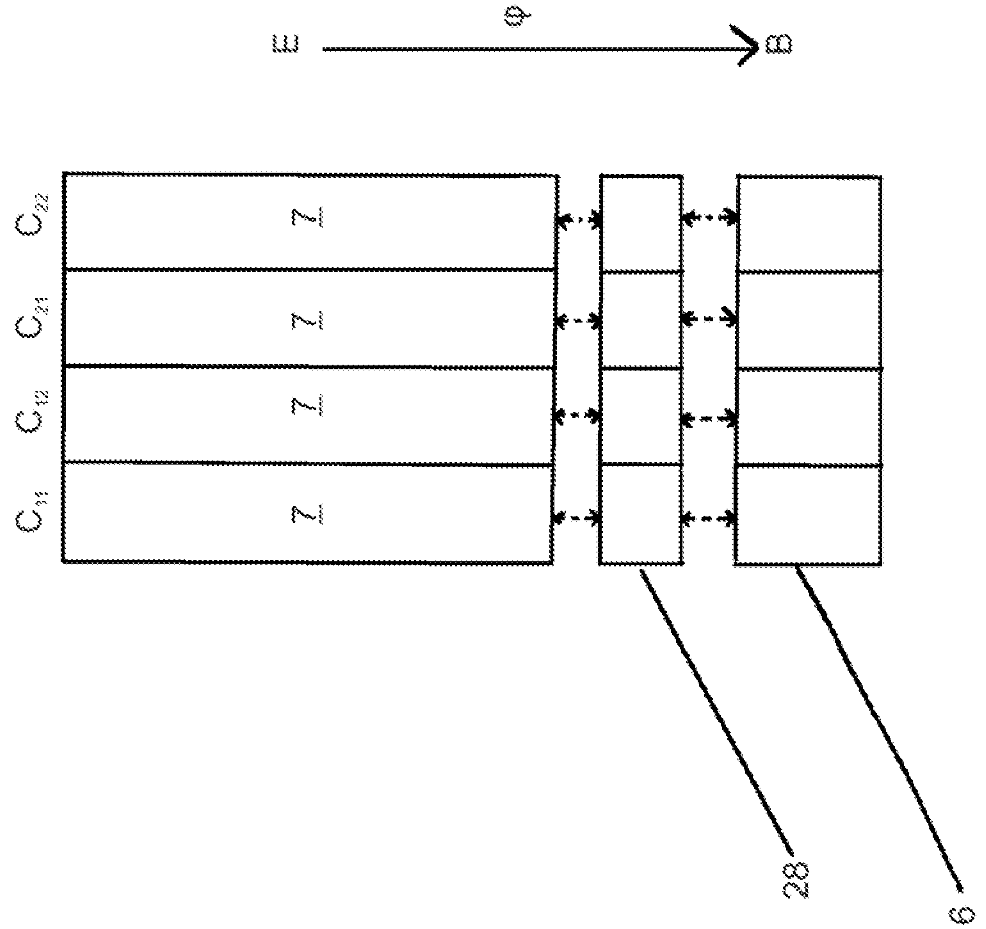
FIG. 15: a correspondence between computational modules and a categorical construct

FIG. 15 shows, by way of example, how a plurality of computation modules 7 (the chosen number of four is an example only) $C_{11}$, $C_{12}$, $C_{21}$, $C_{22}$ which form part of a tensor (here a 2×2 matrix) is used to represent a single category $\varepsilon$ and how, in the information-point-of-view, this category is connected to a base or index category $\mathcal{B}$ via a functor $\phi$ ($\varepsilon$) can be viewed as a fibred category) while in the physical-point-of-view the four computation modules 7 are connected via the routing process 28 to the data hub process 6. The routing process 28 and/or the data hub process 6 know where the information provided by the computation modules 7 has to be sent to.

Figure 16:
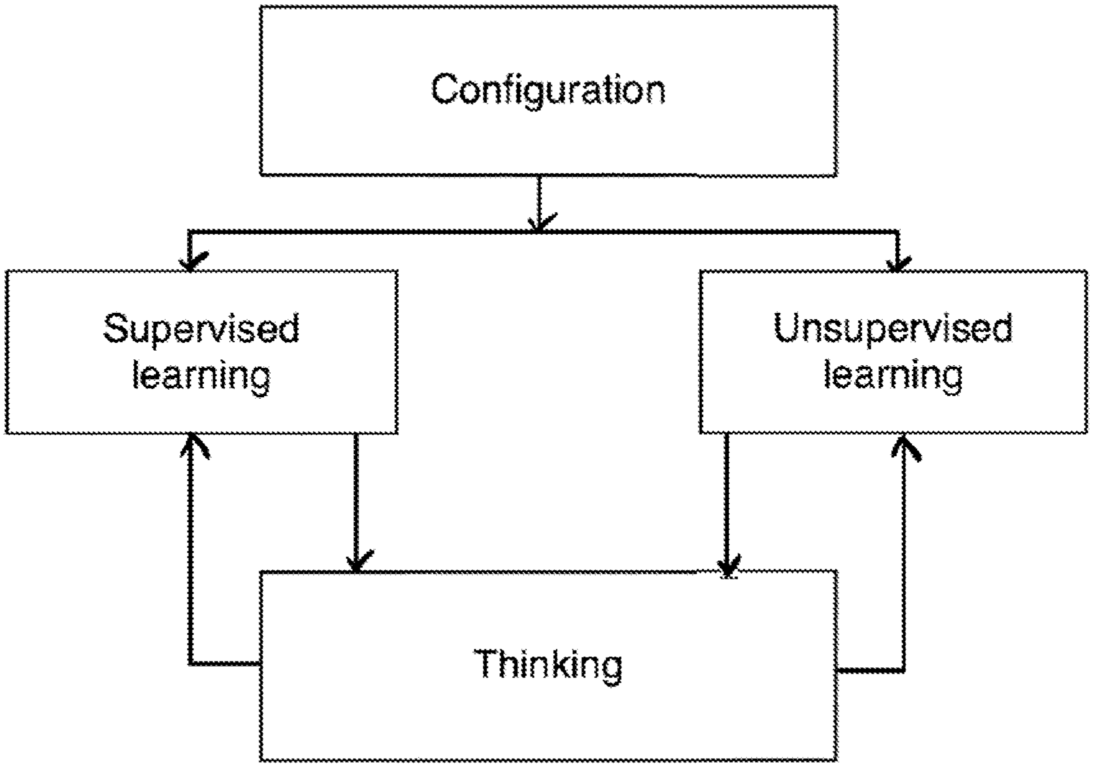
FIG. 16: different phases in the operation of an inventive data processing device

FIG. 16 shows that although, approximatively speaking, different phases can be thought to be present in the operation of an embodiment of a data processing device 1 according to the invention, at least some of these phases can be thought of temporally overlapping or being present in a cyclic way:

A first phase is denoted as "Configuration". In this phase the basic structures of the data processing device 1 are configured such as the presence of the data hub process 6, the presence of the computation modules 7, configuration of categorical structures, configuration of auxiliary processes and the like.

Once this first phase is finished the data processing device 1 can start with supervised training. It is not necessary that this training is done as known in the art (by providing training data to the neuronal networks and adjusting weights until a desired result is achieved with a desired accuracy), although this can be done. According to the invention it is also possible (additionally or alternatively) that the data processing device 1 receives input data ID, e.g., by way of a sensor or by accessing an external database, analyses the input data ID using the computation modules 7 and checks back with an external teacher, e.g., a human operator or an external database or the like, whether the results of the analysis are satisfactory and/or useful. If so, supervised learning is successful, otherwise, another learning loop can be done.

In addition to this supervised learning, unsupervised learning is started by the data processing device 1 in the above-described way using categorical constructs such as objects, morphisms, commutative diagrams, functors, natural transformations, pullbacks, pushouts, projective limits, . . . .

In addition to the phases of supervised and unsupervised learning, once a certain level of knowledge has been achieved by the data processing device 1, the creation of new concepts, i.e., thinking, can be done using random signal RANDOM inputs as described above. Once it has been checked that a new concept makes sense and/or is useful (i.e., is logically correct and/or is useful for data analysis) this new concept can be used in supervised and unsupervised learning processes such that there can be a loop (which can be used during the whole operation of the data processing device 1) between learning (unsupervised and/or supervised) and thinking.

FIG. 17 shows an embodiment in which at least some of the computation modules 7 have a vertical hierarchical organization with, e.g., six layers I-VI. Arrows show the flow of information.

Layer I is configured to process module-specific keyed data segments obtained from shared memory 4. This layer can prepare data to be better suited for processing by the at least one neuronal network 71, e. g., by topological down transformation. This data can comprise, e.g., a target vector for the neuronal networks 71 in layers II and III.

Layers II and III can comprise at least one neuronal network 71 each, each of which processes data obtained from layer I and, possibly, from other computational modules 7. These are the layers where machine learning can take place to process data during data analysis in a cognitive way using well-known neuronal networks such as general ANNs or more specific ANNs like MfNNs, LSTMs, . . . (here synaptic weights w are modified during training to learn pictures, words, . . . ). In some embodiments, these layers can also receive information from at least one other computation module 7, e.g., from layers V or VI of the at least one other computation module 7. In some embodiments, layer III contains at least one neuronal network 71 which receives random signals RANDOM as described above.

Layer IV can comprise at least one neuronal network 71 which, however, is not used for cognitive data processing but to transform data for layers II and III, e.g., by topological down transformation. This data can comprise, e.g., an input vector for the neuronal networks 71 in layers II and III.

In layers V and VI neuronal networks 71 can be present which can be used to learn whether information represented by data is better suited to be processed in a different computation module 7 and can be used to send this data accordingly to the data hub process 6 and/or the shared memory 4 and/or routing processes 28 and/or directly to another computation module 7 where this data can be inputted. e.g., in layers II or III.

Figure 18:
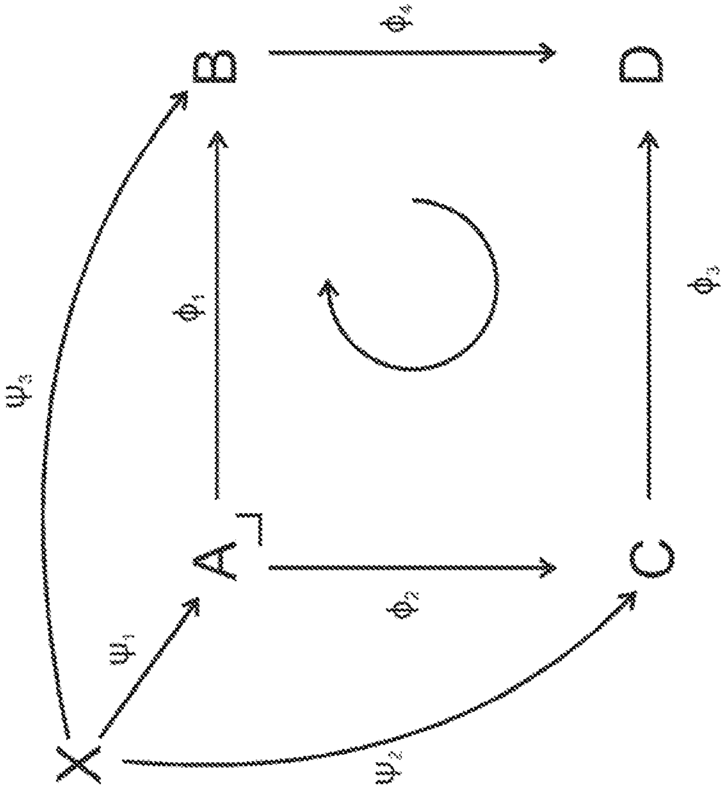
FIG. 18: an example of using the categorical construct "pullback" to define a concept for the data processing device to act upon

FIG. 18 shows an example of using the categorical construct "pullback" to define a concept for the data processing device 1 controlling a robot 20 shown in FIG. 7 to act upon (categorical object A is the pullback of $C \rightarrow D \leftarrow B$, i.e., $C \times_D B$, which is denoted by the small ⌟ placed to the lower right of A):

- Categorical object X represents "a geometrical object that has a discernable geometric shape in the form of a box is to be grabbed by the robot".
- Categorical object A represents "a geometrical object which is to be grabbed by the robot".
- Categorical object B represents "a discernable shape in the form of a box".
- Categorical object C represents "a geometrical object with a discernible shape".
- Categorical object D represents "a discernible shape".
- Functor $\phi_1$ represents "has as discernible shape".
- Functor $\phi_2$ represents "is".
- Functor $\phi_3$ represents "has".
- Functor $\phi_4$ represents "is".
- Functor $\Psi_1$ represents "is an object which is".
- Functor $\Psi_2$ represents "is".
- Functor $\Psi_3$ represents "has as the geometrical object's shape".

The diagram formed by categorical objects A, B, C, D is commutative which is denoted by the arrow ↻. In category theory it can be proven that functor $\Psi_1$ is unique. In other words, there is an unambiguous assignment of the command represented by X to the pullback represented by A which, in turn, is connected to categorical objects C, B, D. During processing of the data provided by the video capturing device 8 it can be checked by the different computation modules 7, or computational groups 16 of computation modules 7, which represent categorical objects C, B, D, whether any of the data can be interpreted as representing one or more of these categorical objects. In case all of these categorical objects are present in the processed data (i.e., all of the following can be ascertained by processing the data: "a shape can be discerned", "the shape can be discerned with respect to a geometrical object", "the shape is in the form of a box") it can be concluded that the command represented by X is to be executed with the effect that out of all possible geometrical objects which might be arranged on the conveyer belt 9 only those are to be grabbed by the robot 20 for which a shape is discernible and which shape is found to be a box 19.

Figure 19C:
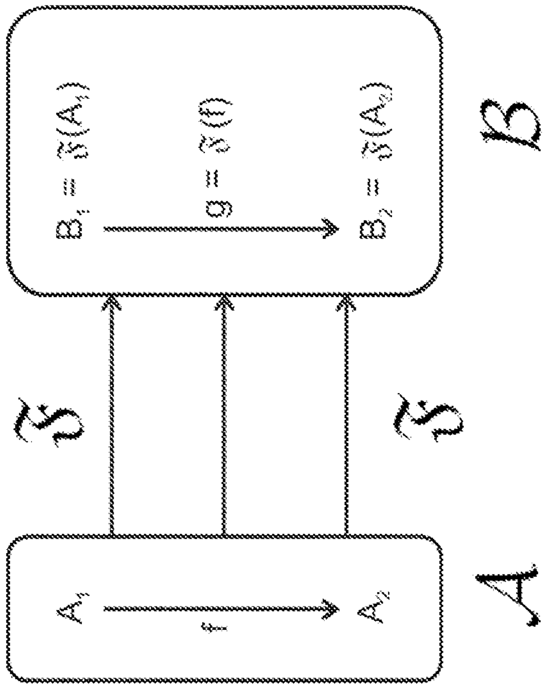
FIG. 19C: an example involving unsupervised learning by using categorical constructs
Figure 19A:
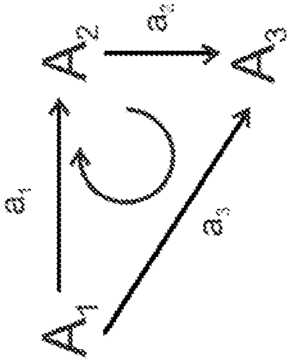
FIG. 19A: an example involving unsupervised learning by using categorical constructs

FIGS. 19A,B,C show examples involving unsupervised learning to learn new concepts by using categorical constructs.

By way of example, FIG. 19A shows a commutative diagram (as denoted by ↻. If $A_1$ represents the person "Anne". $A_2$ represents "a school", $A_3$ represents "a student", $a_1$ represents "attends" and $a_2$ represents "is attended by", then the data processing device can learn the concept that "Anne" is "a student" because $a_2 \circ a_1 = a_3$ gives: "A school is attended by students"∘"Anne attends a school"="Anne is a student.". i.e., $a_3$="is".

Figure 19B:
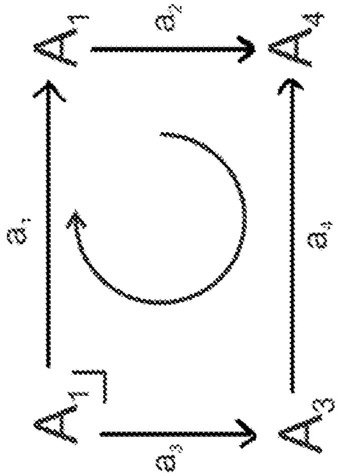
FIG. 19B: an example involving unsupervised learning by using categorical constructs

The example of FIG. 19B shows an analysis of natural language using the categorical construction of a pullback (as denoted by ⌟ where the knowledge of "cats eat meat" and "dogs eat meat", represented by the commutative diagram shown (categorical objects $A_2$, $A_3$ represent "cats" and "dogs", respectively, and the morphisms $a_2$, $a_4$ represent "eat"), has as pullback C "dogs and cats eat" (morphisms $a_1$ and $a_3$ are projections) which can then be abstracted, e.g., to mammals. Upon checking by the data processing device 1 involving a human operator or an external database, this generalization would be found to be incorrect because not all mammals eat meat and the connections between them would have to be retrained.

It is known in category theory that pullbacks can be added by joining the commutative diagrams representing them.

Suppose that, in the example of FIG. 19C, $\mathcal{A}$ represents the category of "box-shaped objects" and category $\mathcal{B}$ represents the category of "tetrahedrons" such that $A_1$, $A_2$ are two boxes which are connected to each other by a rotation represented by morphism f and $B_1$, $B_2$ are two tetrahedrons. In other words, the data processing device 1 has learned that a box which has been rotated is still the same box. Using functor $\mathfrak{F}$ ($\mathfrak{F}: A_1 \rightarrow B_1, A_2 \rightarrow B_2, f \rightarrow g$) this concept can be mapped to the category $\mathcal{B}$ of "tetrahedrons" meaning it is not necessary for the data processing device 1 to re-learn the concept of "rotation of a geometric object" as represented by g in the category of "tetrahedrons".

Figure 20A:
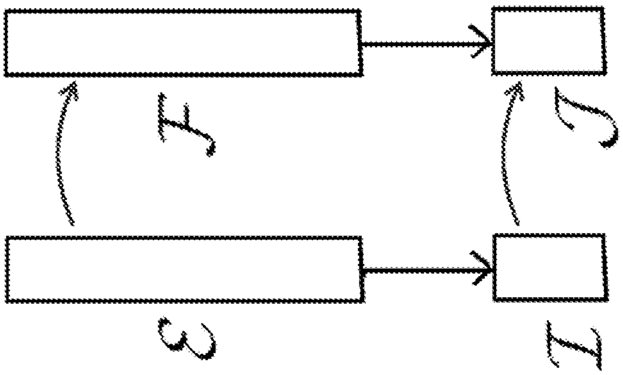
FIG. 20A: an example involving analysis of a combination of data types

FIG. 20A shows an example involving analysis of a combination of data types in the form of objects in images which are provided with image-specific descriptions given in natural language. Another example would be images provided with audio. Another example, involving the same data type, would be the combination of images. The depiction of FIG. 20A relates to an information-point-of-view. Two fibred categories, $\varepsilon$ with base category $\mathcal{I}$ and $\mathcal{F}$ with base category $\mathcal{J}$, are used to represent an image (e.g., a cat being shown in a house) and a description given in natural language and relating to the image of the cat in isolation (this can be done, e.g., by teaching a computation module 7 or a plurality of computation modules 7 to recognize cats), i.e., irrespective of the fact that in the image the cat is located in a house (e.g., a cat is a mammal, it eats fish and meat, . . . ), respectively. Both, the image and the description have, for themselves, unique identifiers, e.g., in the form of keys or addresses or, as shown, by base categories. The data processing device 1 can be trained to learn that a certain description is specific to a certain image such that, in this sense, they belong together. This fact can be learned by functors between the index categories.

Figure 20B:
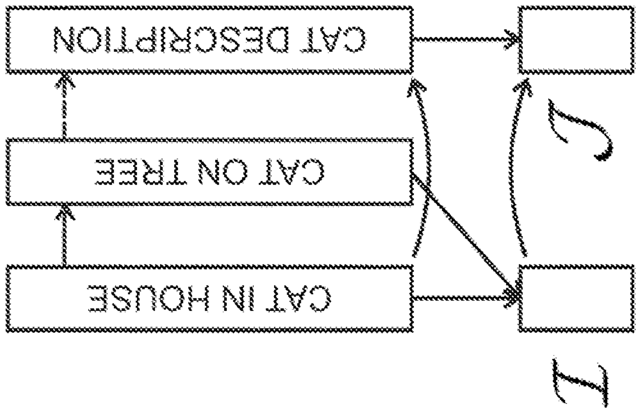
FIG. 20B: an example involving analysis of a combination of data types

FIG. 20B shows an example where it is important that one and the same description has to be specific to different images. For human beings it is intuitively clear that, e.g., a cat which sits on a tree, jumps down from the tree and enters a house is always the same living being. For the neuronal networks 71 that are used to cognitively analyse information in the computation modules 7 this is per se not clear and must be taught in a supervised way. Once the data processing device 1 has learned that a cat that has moved is still the same object, it can learn in an unsupervised way (without the need for a random signal, using only commutativity) that the same description is to be associated to two different images, wherein one of the images shows the cat in the house and the other image shows the same cat in a tree. This is shown by having both categories "cat in house" and "cat in tree" point to the same base category $\mathcal{I}$. The dashed arrow shows the unsupervisedly learned connection between "cat on tree" and the category "cat description". Therefore, the data processing device 1, in some embodiments, is configured to attribute the same natural language description to parts of different images showing the same object.

Figure 21:
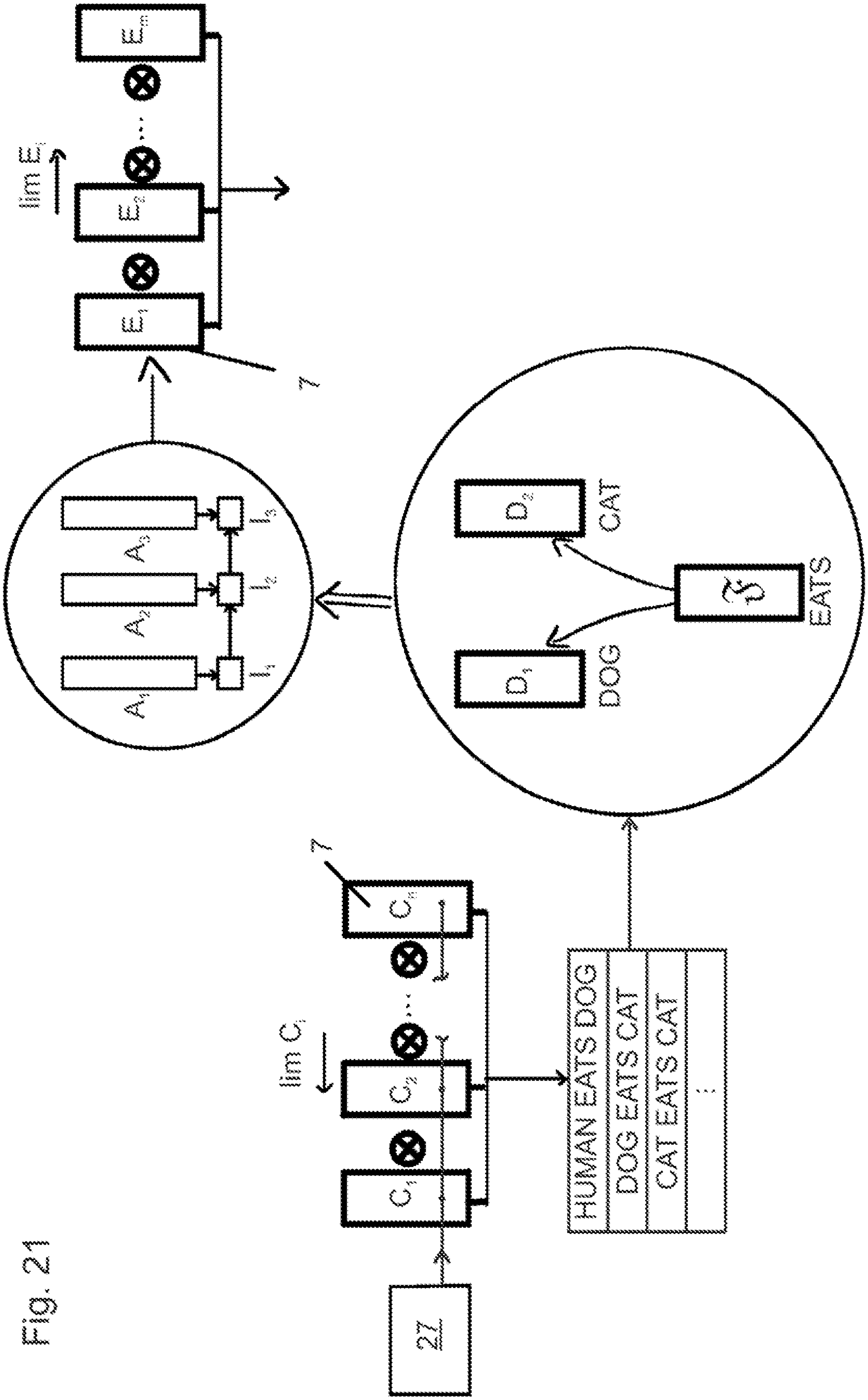
FIG. 21: another example involving analysis of natural language

FIG. 21 shows in a combined information-point-of-view and physical-point-of-view a projective limit $$\overset{\lim}{\leftarrow} C_i$$

which is represented by a plurality of computation modules 7 $C_1, C_2, \ldots, C_n$ which can be used for generation of concepts in language. A random signal generator 27 is coupled to receptors 29 of neuronal networks 71 (which have already been trained with respect to cats and dogs) of the computation modules 7 to create new language concepts such as "Human eats dog.", "Dog eats cat.", "Cat eats cat." and so on. A group of computation modules 7 which have been trained to recognize information comprising "dogs" and "cats" can load these sentences and analyse them, e.g., by breaking the sentence "Dog eats cat" down into its components "dog", "eats" and "cat". As shown in the information-point-of-view this sentence can be analysed by using a trained functor $\mathfrak{F}$ representing the verb "eats" between a category $D_1$ representing dogs and a category $D_2$ representing cats. In the physical-point-of-view these correspond to a plurality of fibred categories $A_1$, $A_2$, $A_3$ with base categories $I_1$, $I_2$, $I_3$. In order to check internally whether this sentence is already known a different plurality of computation modules 7 $E_1, E_2, \ldots, E_m$ which represent an inductive limit $$\overset{\lim}{\rightarrow} E_i$$

can be used to analyse the sentence as a whole. If the sentence is not found internally, it can be analyzed by another group of computation modules 7 representing another projective limit (not shown) which realizes that it does not know whether this concept makes sense. Therefore the data processing device 1 will ask a human operator or an external database whether this concept makes sense. If the external feedback is "not true" this concept will be deleted.

Figure 22A:
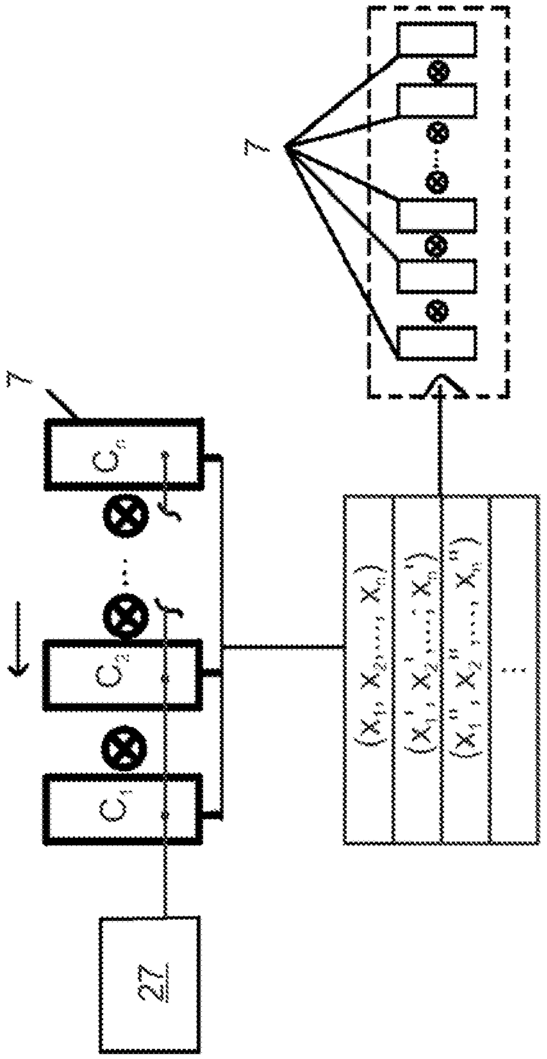
FIG. 22A: an example showing an approximate definition of the allquantor in natural logic

FIG. 22A shows a different use of a projective limit $$\overset{\lim}{\leftarrow} C_i$$

which is inputted with random signals RANDOM, namely how to approximately represent the universal quantifier $\forall$ (the projective limit $$\overset{\lim}{\leftarrow} C_i$$

is represented by computation modules 7 $C_1, C_2, \ldots, C_n$).

Fandom signals RANDOM are inputted by a random signal generator 27 and are used to generate new concepts in the form of test data. Of course, it is impossible to exactly represent a quantifier like $\forall$ which must hold true for an infinite number of elements in a finite system. Therefore, infinity is simulated by inputting the random signals RANDOM to stochastically create ever new test data (e.g., sets of test data like n-tupels $(x_1, x_2, \ldots, x_n)$, $(x'_1, x'_2, \ldots, x'_n)$, $(x''_1, x''_2, \ldots, x''_n)$) which, approximately, can be thought of as having the same effect as if there were an infinite number of test data from which elements can be chosen. In this sense, the randomly (stochastically) generated test data can be thought of simulating the universal quantifier ∀ in the following sense: Suppose the computation modules 7 representing the projective limit $$\lim_{\leftarrow} C_i$$

have learned some facts, e.g., regarding prime numbers, which they use to formulate a hypothesis (e.g., for all natural numbers n there is a larger natural number m which is prime). Then, using a multitude of test data which is stochastically generated, they can check whether the hypothesis is true with respect to a given predicate, e.g., whether it is true that for each natural number of the test data there is a larger natural number which is prime. Of course, this is not a mathematical proof in the traditional sense. Rather the reasoning is, that if a hypothesis is checked for a very large number of test data and holds true for each of the test data, it might as well be considered true for all possible data. Another example would be "All humans are mortal". Test data would include information regarding a plurality of humans and the data processing device would check for each of the humans whether the human is dead.

Figure 22B:
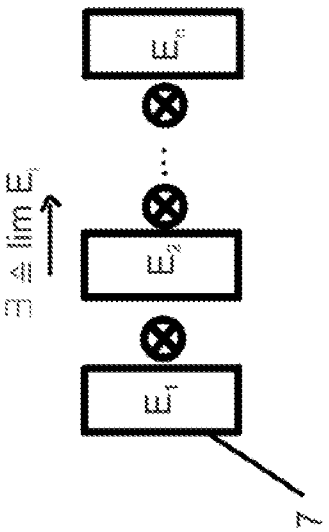
FIG. 22B: an example showing an approximate definition of the existence quantor in natural logic

In this way, unsupervised learning can take place, in some embodiments even without checking with an external reference such as a human operator or an external database. Checking can be, e.g., done using other computation modules 7 ($E_1$, $E_2$, . . . , $E_n$), in particular computational modules 7 which, together, represent an inductive limit $$\lim_{\rightarrow} E_i$$

which can be viewed as an existential quantifier $\mathcal{F}$ of natural logic (cf. FIG. 22*b*). Once a hypothesis has been checked it can be sent for representation to another group of computation modules 7 to free the computation modules 7 $C_1$, $C_2$, . . . , $C_n$ for checking other hypothesis.

Figure 23:
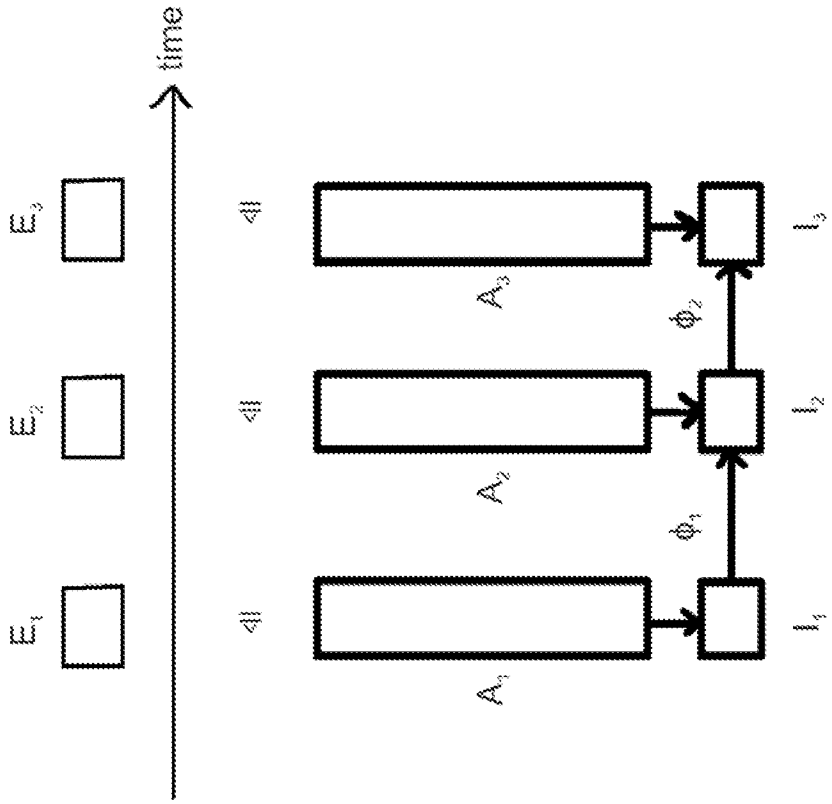
FIG. 23: an example how the data processing device can construct a sense of orientation in time
Figure 24:
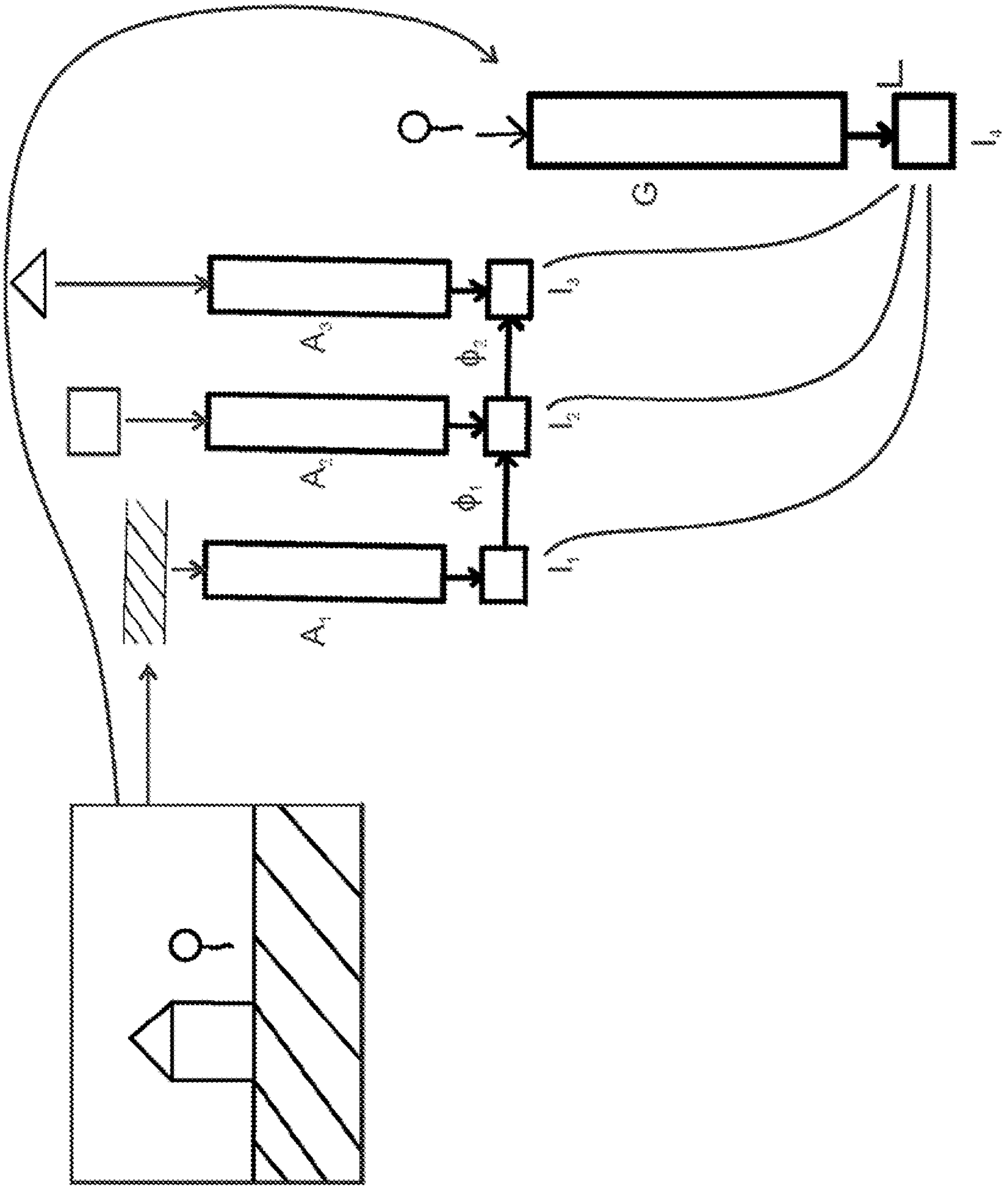
FIG. 24: an example how the data processing device can construct a sense of orientation in space

FIG. 23 and FIG. 24 show examples how the data processing device 1 can construct a sense of orientation in time and/or space not by providing a coordinate system for time and/or space but by encoding temporal and spatial relationships in non-commuting morphisms or functors.

In FIG. 23 three events $E_1$, $E_2$, $E_3$ (e.g., frames in a movie or inputs to a sensor) which happen during different time spans are shown by way of example. Data relating these events is inputted into the data processing device 1 and is represented by, e.g., a category $A_1$, $A_2$, $A_3$ for each of the three events $E_1$, $E_2$, $E_3$. In some embodiments, events which are inputted after another within a pre-determinable time span, e.g., between 0.1 seconds to 0.5 seconds, are represented in a connected way by connecting the base categories $I_1$, $I_2$, $I_3$ of the categories $A_1$, $A_2$, $A_3$ by non-commuting functors $\phi_1$, $\phi_2$ (i.e., $\phi_1 \circ \phi_2 \neq \phi_2 \circ \phi_1$). Alternatively, the data processing device 1 could be explicitly instructed to connect these events. In either way, causal relationships and temporal concepts such as "earlier" and "later" can be encoded, e.g., by functors between the categories $A_1$, $A_2$, $A_3$.

Also, temporal sentences like "I will go to school tomorrow." can be analysed using the concept showing in FIG. 23 if the data processing device 1 has been trained to recognize that "will" and "tomorrow" imply that there is a present and a future. This time ordering can be represented by categories which are connected via their bases as described above.

In FIG. 24 an image is depicted showing a ground on which sits a house having a single level covered by a roof and a balloon floating at one side of the house. The data processing device 1 analyses the image and extracts the different objects, i.e., "ground". "level of house". "roof" and "balloon". The spatial relationships between these objects are encoded by non-commuting functors $\phi_1$, $\phi_2$ between the base categories $I_1$, $I_2$, $I_3$, $I_4$ of the categories $A_1$, $A_2$, $A_3$, G. They are non-commuting because, e.g., the house stands on the ground and not the other way round. Therefore, in the example of FIG. 24, the more to the right a category is the higher the object represented by that category is arranged in the image.

In this example it can be seen that a base category can also be a fibred category, having a base category ($I_4$), itself which, in this example is used to encode that the balloon is to one side of the house.

Figure 25B:
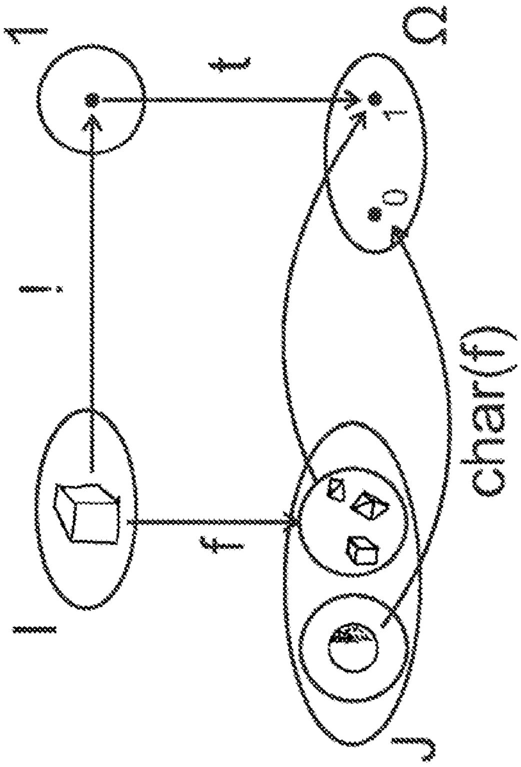
FIG. 25B: an example how a sub-object classifier can be used It should be noted that the number of components shown in the Figures is to be understood exemplary and not limiting. In particular with respect to the computation modules 7 it is to be assumed that in reality there will be many more instantiations than shown in the Figures. Dashed lines show at least some of the interactions between components of the data processing device 1 but, possibly, not all of the interactions. It should also be noted that graphical representations of entities such as computation modules 7 or images of objects shown in conjunction with such entities (e.g., geometrical bodies) are drawn for better understanding of the invention but, with respect to the data processing device 1, are entities encoded in computer code and instantiated during runtime (technical-point-of-view) or categorical representations (information-point-of-view)
Figure 25A:
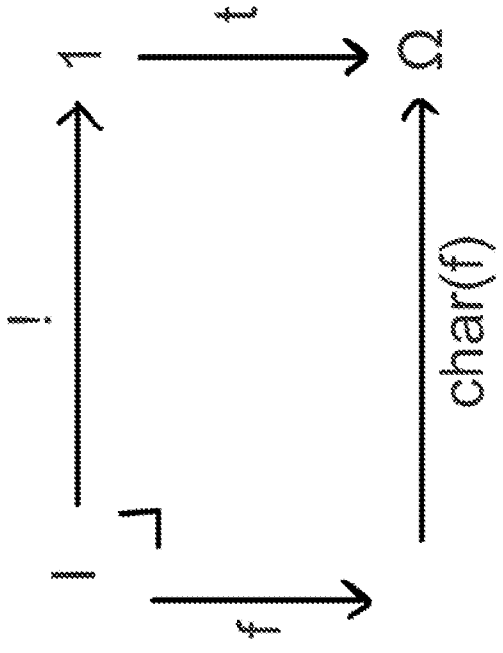
FIG. 25A: an example how a sub-object classifier can be constructed

FIG. 25A shows the construction of a sub-object classifier for a category $\mathcal{C}$ , which is, e.g. a topos. It is an object Ω together with a morphism t: 1→Ω from the terminal object 1 to object Ω with the property that for any monomorphism f: I→J in $\mathcal{C}$ there exists a unique morphism char(f): J→Ω (called characteristic function) such that the diagram shown in FIG. 25A is a pullback.

FIG. 25B shows an example, in which this concept can be used to define whether a certain geometric object, here a cube or box belongs to the sub-category of polyhedrons (which forms a sub-category of all geometric shapes as symbolized by the presence of a ball). To encode this fact in a categorical way the sub-object classifier Ω (here a two-element set) together with the morphism t: 1→Ω from the terminal object 1 (here a singleton set in the category of sets) to Ω is used. The cube or box is sent by char(f) to the element 1 (or "true") while the ball is sent to the element 0 (or "false").

REFERENCE SIGNS LIST

1 data processing device
2 first interface
3 second interface
4 shared memory device
5 computing device
6 data hub process
61 segmentation sub-process
62 keying sub-process
7 computation module
71 neuronal network
8 video capturing device
9 conveyor belt
10 layer I
11 layer II
12 layer III
13 layer IV
14 layer V
15 layer VI
16 computational group
17 tetrahedron
18 octahedron
19 box
20 robot
21 artificial neuron
22 integration function
23 activation function
24 synapse of artificial neuron
25 branching of axon of artificial neuron
26 weight storage

27 random signal generator
28 routing process
29 receptor for random signal
ID input data
OD output data
$K_i$ ith key
$S_i$ ith data segment
$KS_i$ ith keyed data segment
$L_i$ ith layer of neuronal network
RANDOM random signal $$\varprojlim C_i$$

projective limit $$\varinjlim C_i$$

inductive limit
Ω sub-object classifier
∀ universal quantifier
∃ existential quantifier
⌟ pullback
$\mathcal{F}$ commutative diagram

The invention claimed is:

1. A computer comprising:
a first interface for receiving input data;
a second interface for outputting output data;
a shared memory; and
a processor connected to the first interface, the second interface and the shared memory,
wherein the processor is configured to:
receive the input data from the first interface;
send the output data to the second interface;
read data from and write data into the shared memory; and
execute, in parallel, a plurality of processes including:
a data hub process of receiving the input data from the first interface or the shared memory, the data hub process including a keying sub-process which provides keys to data segments of the input data creating keyed data segments such that the data hub process stores the keyed data segments in the shared memory as shared keyed data segments; and
a plurality of computation modules each configured to:
access the shared memory to look for module-specific data segments which are the shared keyed data segments that are keyed specifically for one computation module of the plurality of computation modules;
execute a machine learning method on the module-specific data segments, the machine learning method including data interpretation and classification methods using an artificial neuronal network; and
output a result of the machine learning method to the shared memory or another computation module of the plurality of computation modules,
wherein at least part of the plurality of computation modules is configured to represent categorical constructions, and
wherein the computer is configured to perform unsupervised learning using commutating diagrams to determine unknown objects or morphisms.

2. The computer of claim 1, wherein:
the at least part of the plurality of computation modules has a hierarchical vertical structure with layers; or
the at least part of the plurality of computation modules is formed into a horizontal structure by computational groups.

3. The computer of claim 1, wherein the processor is further configured to execute a routing process which directs output provided by the one computation module of the plurality of computation modules to the shared memory or the other computation module of the plurality of computation modules.

4. The computer of claim 1, wherein the data hub process includes a segmentation subprocess which segments the input data into data segments and keeps information regarding which of the shared keyed data segments were segmented from the same input data.

5. The computer of claim 4, wherein the data hub process stores the shared keyed data segments in the shared memory and keeps the information regarding which of the shared keyed data segments were segmented from the same input data using a machine learning technique.

6. The computer of claim 5, wherein the machine learning technique includes a neuronal network.

7. The computer of claim 1, wherein the processor is configured to repeatedly check weights of synapses of the artificial neuronal networks of the at least part of the plurality of computation modules to make sure the weights do not diverge.

8. The computer of claim 7, wherein the processor is configured to repeatedly check the weights of the synapses of the artificial neuronal networks of all of the plurality of computation modules to make sure the weights do not diverge.

9. The computer of claim 1, wherein the processor is configured to create an orientation in space or time using non-commutating morphisms or functors.

10. The computer of claim 1, further comprising a random signal generator configured to input random signals to at least two artificial neurons of the artificial neuronal networks of the at least part of the plurality of computation modules.

11. The computer of claim 10, wherein the at least part of the plurality of computation modules represents a projective limit to generate random data sets which are used to test a hypotheses and simulate a universal quantifier of natural logic.

12. The computer of claim 10, wherein the random signals are used to create new concepts.

13. The computer of claim 12, wherein the random signals are used to create the new concepts using projective limits.

14. The computer of claim 1, wherein the processor is configured to attribute a same natural language description to parts of different images showing a same object.

15. The computer of claim 1, wherein the processor is configured to:
perform supervised and unsupervised learning; and
use new concepts created using random signals in the supervised and unsupervised learning.

16. The computer of claim 1, wherein the categorical constructions are configured to be chosen from a group including objects, morphisms, functors, commutative diagrams, non-commuting morphisms or functors, natural transformations, pullbacks, pushforwards, projective limits, inductive limits, or sub-object classifiers.

17. A method for processing data, the method comprising:
receiving, by a computer, input data;
outputting, by the computer, output data;
reading, by the computer, data from a shared memory and writing, by the computer, data into the shared memory; and executing, in parallel, a plurality of processes including:

a data hub process of receiving the input data from the first interface or the shared memory, the data hub process including a keying sub-process which provides keys to data segments of the input data creating keyed data segments such that the data hub process stores the keyed data segments in the shared memory as shared keyed data segments; and a plurality of computation modules each configured to:

access the shared memory to look for module-specific data segments which are the shared keyed data segments that are keyed specifically for one computation module of the plurality of computation modules;

execute a machine learning method on the module-specific data segments, the machine learning method including data interpretation and classification methods using an artificial neuronal network; and output a result of the machine learning method to the shared memory or another computation module of the plurality of computation modules, wherein at least part of the plurality of computation modules is configured to represent categorical constructions, and wherein the computer is configured to perform unsupervised learning using commutating diagrams to determine unknown objects or morphisms.

18. The method of claim 17, wherein:

the at least part of the plurality of computation modules has a hierarchical vertical structure with layers; or the at least part of the plurality of computation modules is formed into a horizontal structure by computational groups.

19. The method of claim 17, further comprising executing a routing process which directs output provided by the one computation module of the plurality of computation modules to the shared memory or the other computation module of the plurality of computation modules.

20. The method of claim 17, wherein the data hub process includes a segmentation subprocess which segments the input data into data segments and keeps information regarding which of the shared keyed data segments were segmented from the same input data.

21. The method of claim 20, wherein the data hub process stores the shared keyed data segments in the shared memory and keeps the information regarding which of the shared keyed data segments were segmented from the same input data using a machine learning technique.

22. The method of claim 21, wherein the machine learning technique includes a neuronal network.

23. The method of claim 17, further comprising repeatedly checking weights of synapses of the artificial neuronal networks of the at least part of the plurality of computation modules to make sure the weights do not diverge.

24. The method of claim 23, wherein the weights of the synapses of the artificial neuronal networks of all of the plurality of computation modules are repeatedly checked to make sure the weights do not diverge.

25. The method of claim 17, further comprising creating an orientation in space or time using non-commutating morphisms or functors.

26. The method of claim 17, further comprising inputting random signals to at least two artificial neurons of the artificial neuronal networks of the at least part of the plurality of computation modules.

27. The method of claim 26, wherein the at least part of the plurality of computation modules represents a projective limit to generate random data sets which are used to test a hypotheses and simulate a universal quantifier of natural logic.

28. The method of claim 26, wherein the random signals are used to create new concepts.

29. The method of claim 28, wherein the random signals are used to create the new concepts using projective limits.

30. The method of claim 17, further comprising attributing a same natural language description to parts of different images showing a same object.

31. The method of claim 17, further comprising:

performing supervised and unsupervised learning; and using new concepts created using random signals in the supervised and unsupervised learning.

32. A non-transitory computer-readable medium having a program stored thereon for causing a computer to perform the method of claim 17.

33. The method of claim 17, wherein each of the plurality of computation modules is further configured to: (i) execute the machine learning method on the module-specific data segments if at least one of the module-specific data segments is present; and (ii) run idle if no module-specific data segment is present.

34. The method of claim 17, wherein the categorical constructions are chosen from a group including objects, morphisms, functors, commutative diagrams, non-commuting morphisms or functors, natural transformations, pullbacks, pushforwards, projective limits, inductive limits, or sub-object classifiers.

35. A computer comprising:

a first interface for receiving input data;

a second interface for outputting output data;

a shared memory; and a processor connected to the first interface, the second interface and the shared memory, wherein the processor is configured to:

receive the input data from the first interface;

send the output data to the second interface;

read data from and write data into the shared memory; and execute, in parallel, a plurality of processes including:

a data hub process of receiving the input data from the first interface or the shared memory, the data hub process including a keying sub-process which provides keys to data segments of the input data creating keyed data segments such that the data hub process stores the keyed data segments in the shared memory as shared keyed data segments; and a plurality of computation modules each configured to:

access the shared memory to look for module-specific data segments which are the shared keyed data segments that are keyed specifically for one computation module of the plurality of computation modules;

execute a machine learning method on the module-specific data segments, the machine learning method including data interpretation and classification methods using an artificial neuronal network; and output a result of the machine learning method to the shared memory or another computation module of the plurality of computation modules, wherein the data hub process includes a segmentation subprocess which segments the input data into data segments and keeps information regarding which of the shared keyed data segments were segmented from the same input data, and wherein the data hub process stores the shared keyed data segments in the shared memory and keeps the information regarding which of the shared keyed data segments were segmented from the same input data using a machine learning technique.

36. A computer comprising:

a first interface for receiving input data;

a second interface for outputting output data;

a shared memory; and a processor connected to the first interface, the second interface and the shared memory, wherein the processor is configured to:

receive the input data from the first interface;

send the output data to the second interface;

read data from and write data into the shared memory; and execute, in parallel, a plurality of processes including:

a data hub process of receiving the input data from the first interface or the shared memory, the data hub process including a keying sub-process which provides keys to data segments of the input data creating keyed data segments such that the data hub process stores the keyed data segments in the shared memory as shared keyed data segments; and a plurality of computation modules each configured to:

access the shared memory to look for module-specific data segments which are the shared keyed data segments that are keyed specifically for one computation module of the plurality of computation modules;

execute a machine learning method on the module-specific data segments, the machine learning method including data interpretation and classification methods using an artificial neuronal network; and output a result of the machine learning method to the shared memory or another computation module of the plurality of computation modules, wherein at least part of the plurality of computation modules is configured to represent categorical constructions, and wherein the processor is configured to create an orientation in space or time using non-commutating morphisms or functors.

37. A computer comprising:

a first interface for receiving input data;

a second interface for outputting output data;

a shared memory; and a processor connected to the first interface, the second interface and the shared memory, wherein the processor is configured to:

receive the input data from the first interface;

send the output data to the second interface;

read data from and write data into the shared memory; and execute, in parallel, a plurality of processes including:

a data hub process of receiving the input data from the first interface or the shared memory, the data hub process including a keying sub-process which provides keys to data segments of the input data creating keyed data segments such that the data hub process stores the keyed data segments in the shared memory as shared keyed data segments; and a plurality of computation modules each configured to:

access the shared memory to look for module-specific data segments which are the shared keyed data segments that are keyed specifically for one computation module of the plurality of computation modules;

execute a machine learning method on the module-specific data segments, the machine learning method including data interpretation and classification methods using an artificial neuronal network; and output a result of the machine learning method to the shared memory or another computation module of the plurality of computation modules, wherein at least part of the plurality of computation modules is configured to represent categorical constructions, and wherein a random signal generator is configured to input random signals to at least two artificial neurons of the artificial neuronal networks of the at least part of the plurality of computation modules representing a projective limit to generate random data sets which are used to test a hypotheses and simulate a universal quantifier of natural logic.

38. A method for processing data, the method comprising:

receiving, by a computer, input data;

outputting, by the computer, output data;

reading, by the computer, data from a shared memory and writing, by the computer, data into the shared memory; and executing, in parallel, a plurality of processes including:

a data hub process of receiving the input data from the first interface or the shared memory, the data hub process including a keying sub-process which provides keys to data segments of the input data creating keyed data segments such that the data hub process stores the keyed data segments in the shared memory as shared keyed data segments; and a plurality of computation modules each configured to:

access the shared memory to look for module-specific data segments which are the shared keyed data segments that are keyed specifically for one computation module of the plurality of computation modules;

execute a machine learning method on the module-specific data segments, the machine learning method including data interpretation and classification methods using an artificial neuronal network; and output a result of the machine learning method to the shared memory or another computation module of the plurality of computation modules, wherein the data hub process includes a segmentation subprocess which segments the input data into data segments and keeps information regarding which of the shared keyed data segments were segmented from the same input data, and wherein the data hub process stores the shared keyed data segments in the shared memory and keeps the information regarding which of the shared keyed data segments were segmented from the same input data using a machine learning technique.

39. The method of claim 38, wherein each of the plurality of computation modules is further configured to: (i) execute the machine learning method on the module-specific data segments if at least one of the module-specific data segments is present; and (ii) run idle if no module-specific data segment is present.

40. A method for processing data, the method comprising:

receiving, by a computer, input data;

outputting, by the computer, output data;

reading, by the computer, data from a shared memory and writing, by the computer, data into the shared memory; and executing, in parallel, a plurality of processes including:

a data hub process of receiving the input data from the first interface or the shared memory, the data hub process including a keying sub-process which provides keys to data segments of the input data creating keyed data segments such that the data hub process stores the keyed data segments in the shared memory as shared keyed data segments; and a plurality of computation modules each configured to:

access the shared memory to look for module-specific data segments which are the shared keyed data segments that are keyed specifically for one computation module of the plurality of computation modules;

execute a machine learning method on the module-specific data segments, the machine learning method including data interpretation and classification methods using an artificial neuronal network; and output a result of the machine learning method to the shared memory or another computation module of the plurality of computation modules, wherein at least part of the plurality of computation modules is configured to represent categorical constructions, and wherein the method further comprises creating an orientation in space or time using non-commutating morphisms or functors.

41. The method of claim 40, wherein each of the plurality of computation modules is further configured to: (i) execute the machine learning method on the module-specific data segments if at least one of the module-specific data segments is present; and (ii) run idle if no module-specific data segment is present.

42. A method for processing data, the method comprising:

receiving, by a computer, input data;

outputting, by the computer, output data;

reading, by the computer, data from a shared memory and writing, by the computer, data into the shared memory; and executing, in parallel, a plurality of processes including:

a data hub process of receiving the input data from the first interface or the shared memory, the data hub process including a keying sub-process which provides keys to data segments of the input data creating keyed data segments such that the data hub process stores the keyed data segments in the shared memory as shared keyed data segments; and a plurality of computation modules each configured to:

access the shared memory to look for module-specific data segments which are the shared keyed data segments that are keyed specifically for one computation module of the plurality of computation modules;

execute a machine learning method on the module-specific data segments, the machine learning method including data interpretation and classification methods using an artificial neuronal network; and output a result of the machine learning method to the shared memory or another computation module of the plurality of computation modules, wherein at least part of the plurality of computation modules is configured to represent categorical constructions, and wherein the at least part of the plurality of computation modules represents a projective limit to generate random data sets which are used to test a hypotheses and simulate a universal quantifier of natural logic.

43. The method of claim 42, wherein each of the plurality of computation modules is further configured to: (i) execute the machine learning method on the module-specific data segments if at least one of the module-specific data segments is present; and (ii) run idle if no module-specific data segment is present.

* * * * *